US012379301B2

(12) United States Patent
Howell

(10) Patent No.: US 12,379,301 B2
(45) Date of Patent: Aug. 5, 2025

(54) CLOSED-SYSTEM SORTING FLOW CYTOMETER ADAPTERS AND METHODS OF USE THEREOF

(71) Applicant: Becton, Dickinson and Company, Franklin Lakes, NJ (US)

(72) Inventor: Wesley Howell, San Jose, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 817 days.

(21) Appl. No.: 17/678,476

(22) Filed: Feb. 23, 2022

(65) Prior Publication Data

US 2022/0326138 A1 Oct. 13, 2022

Related U.S. Application Data

(60) Provisional application No. 63/165,339, filed on Mar. 24, 2021.

(51) Int. Cl.
*G01N 15/1404* (2024.01)
*G01N 15/10* (2024.01)
*G01N 15/14* (2024.01)
*G01N 15/149* (2024.01)

(52) U.S. Cl.
CPC ..... *G01N 15/1404* (2013.01); *G01N 15/1459* (2013.01); *G01N 2015/1006* (2013.01); *G01N 15/149* (2024.01)

(58) Field of Classification Search
CPC ........... G01N 15/1404; G01N 15/1459; G01N 15/149; G01N 2015/1006
See application file for complete search history.

(56) References Cited

U.S. PATENT DOCUMENTS

| 2,606,652 | A | 8/1952 | Jaquette et al. |
| 4,111,753 | A | 9/1978 | Folsom et al. |
| 4,162,024 | A | 7/1979 | Shanley |
| 4,279,345 | A | 7/1981 | Allred |
| 5,441,708 | A | 8/1995 | Diccianni et al. |

(Continued)

FOREIGN PATENT DOCUMENTS

WO    WO200185088 A1    11/2001

OTHER PUBLICATIONS

Becton, Dickinson and Company, "Flow cytometry in the study of anaerobic bacteria—The Bioaster Anoxic Platform", https://www.flowcytometry-news.com/category/the-cytohub/2019/06/17/flow-cytometry-in-the-study-of-anaerobic-bacteria-the-bioaster-anoxic-platform/, 2021, 4 pages.

(Continued)

*Primary Examiner* — Dominic J Bologna
(74) *Attorney, Agent, or Firm* — Nicholas D. Cervenka; BOZICEVIC, FIELD & FRANCIS LLP

(57) ABSTRACT

Closed-system sorting flow cytometer adapters for converting a sorting flow cytometer having a sort block into a closed-system sorting flow cytometer are provided. Adapters of interest include a sort block coupler for operably connecting to the sort block, an external chamber, and a connector for gaseously coupling the sort block to the external chamber, optionally via a sort bucket that is in cellular-receiving relationship with the sort block coupler. Flow cytometers having closed-system sorting flow cytometer adapters are also disclosed. Methods, computer systems and kits for carrying out the invention are additionally provided.

19 Claims, 12 Drawing Sheets

(56) References Cited

U.S. PATENT DOCUMENTS

| | | | |
|---|---|---|---|
| 5,641,457 | A | 6/1997 | Vardanega et al. |
| 5,700,692 | A | 12/1997 | Sweet |
| 5,776,781 | A | 7/1998 | Vardanega et al. |
| 6,014,904 | A | 1/2000 | Lock |
| 6,372,506 | B1 | 4/2002 | Norton |
| 6,510,007 | B1 | 1/2003 | Blasenheim |
| 6,683,314 | B2 | 1/2004 | Oostman, Jr. et al. |
| 6,809,804 | B1 | 10/2004 | Yount et al. |
| 6,880,414 | B2 | 4/2005 | Norton |
| 6,944,338 | B2 | 9/2005 | Lock et al. |
| 7,129,505 | B2 | 10/2006 | Oostman, Jr. et al. |
| 7,201,875 | B2 | 4/2007 | Norton et al. |
| 7,544,326 | B2 | 6/2009 | Norton et al. |
| 7,880,108 | B2 | 2/2011 | Schembre et al. |
| 9,575,050 | B2 | 2/2017 | Vrane et al. |
| 2002/0042148 | A1* | 4/2002 | Monard .............. B08B 15/023 436/183 |
| 2005/0019949 | A1 | 1/2005 | Hall et al. |
| 2005/0112541 | A1 | 5/2005 | Durack et al. |
| 2009/0107893 | A1* | 4/2009 | Schembri .............. B03C 7/12 209/127.1 |
| 2010/0330651 | A1 | 12/2010 | Venter et al. |
| 2012/0024857 | A1 | 2/2012 | Kodama et al. |
| 2012/0038914 | A1 | 2/2012 | Luscher |
| 2012/0288920 | A1* | 11/2012 | Takeda .............. G01N 15/1436 435/286.5 |
| 2013/0309763 | A1 | 11/2013 | Hashimoto et al. |
| 2015/0099262 | A1* | 4/2015 | Murdoch .......... G01N 15/1459 435/5 |
| 2015/0198508 | A1* | 7/2015 | Ebi .................. C12N 5/0682 435/308.1 |
| 2017/0299493 | A1 | 10/2017 | Norton |
| 2018/0113063 | A1* | 4/2018 | Kersten ................ B01L 3/502 |
| 2018/0128728 | A1* | 5/2018 | Lee .................... H05K 3/064 |
| 2018/0267021 | A1* | 9/2018 | Suresh ................ G01N 15/10 |
| 2019/0331585 | A1 | 10/2019 | Norton |
| 2019/0331657 | A1 | 10/2019 | Dembski et al. |
| 2020/0132590 | A1 | 4/2020 | Dembski |
| 2020/0141961 | A1 | 5/2020 | Ahlfors |
| 2020/0408667 | A1 | 12/2020 | Gulley |

OTHER PUBLICATIONS

BD Biosciences, BD FACSDiva Software Quick Reference Guide for BD FACSAria Cell Sorters, Jan. 2009, 8 pages, Available online: http://www.bdbiosciences.com/documents/facsdivav61_aria_quickrefguide.pdf.

BD Biosciences, BD FACSAria III User's Guide, May 2012, 346 pages, Available online: http://www.bdbiosciences.com/documents/BD_FACSAria_III_User_Guide.pdf.

BD Biosciences, BD FACSAria III Cell Sorter: Technical Specifications, 2010, 4 pages, Available online: http://www.bdbiosciences.com/documents/BD_FACSAria_III_tech_specs.pdf.

BD Biosciences, BD FACSAria III Cell Sorter Brochure, 2010, 16 pages, Available online: http://www.bdbiosciences.com/documents/BD_FACSAria_III_brochure.pdf.

BD Biosciences, BD FACSAria Fusion Cell Sorter: Technical Specifications, 23-15075-02, label approval notification Jul. 16, 2014, available in print Aug. 11, 2014, 4 pages, Available online: http://www.bdbiosciences.com/documents/BD_FACSAria_fusion_tech_specs.pdf.

BD Biosciences, BD FACSAria Fusion Cell Sorter: Recommended Filter Guide, 23-15074-0, label approval notification Sep. 25, 2014, available in print Oct. 6, 2014, 1 page, Available online: http://www.bdbiosciences.com/documents/BD_FACSAria_fusion_filter_guide.pdf.

BD Biosciences, BD FACSAria Fusion Brochure, 23-14994-0, label approval notification Aug. 7, 2014, available in print Sep. 4, 2014, 20 pages, Available online: http://www.bdbiosciences.com/documents/BD_FACSAria_fusion_brochure.pdf.

* cited by examiner

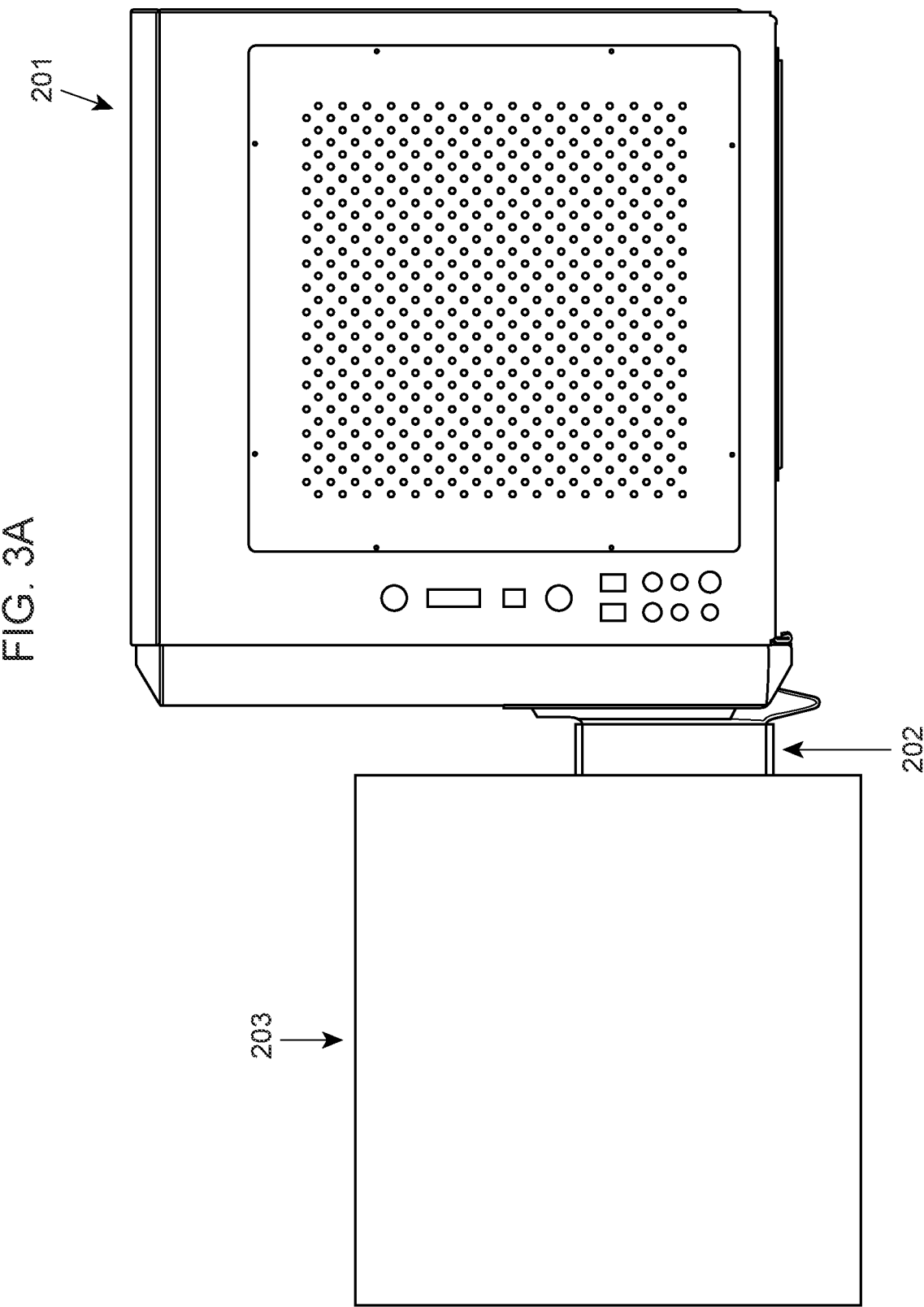

CLOSED-SYSTEM SORTING FLOW CYTOMETER ADAPTERS AND METHODS OF USE THEREOF

CROSS-REFERENCE TO RELATED APPLICATIONS

Pursuant to 35 U.S.C. § 119 (e), this application claims priority to the filing date of U.S. Provisional Patent Application Ser. No. 63/165,339 filed Mar. 24, 2021; the disclosure of which application is incorporated herein by reference in their entirety.

INTRODUCTION

Flow-type particle sorting systems, such as sorting flow cytometers, are used to sort particles in a fluid sample based on at least one measured characteristic of the particles. In a flow-type particle sorting system, particles, such as molecules, analyte-bound beads, or individual cells, in a fluid suspension are passed in a stream by a detection region in which a sensor detects particles contained in the stream of the type to be sorted. The sensor, upon detecting a particle of the type to be sorted, triggers a sorting mechanism that selectively isolates the particle of interest.

Particle sensing typically is carried out by passing the fluid stream by a detection region in which the particles are exposed to irradiating light, from one or more lasers, and the light scattering and fluorescence properties of the particles are measured. Particles or components thereof can be labeled with fluorescent dyes to facilitate detection, and a multiplicity of different particles or components may be simultaneously detected by using spectrally distinct fluorescent dyes to label the different particles or components. Detection is carried out using one or more photosensors to facilitate the independent measurement of the fluorescence of each distinct fluorescent dye.

The parameters measured using a flow cytometer typically include light at the excitation wavelength scattered by the particle in a narrow angle along a mostly forward direction, referred to as forward-scatter (FSC), the excitation light that is scattered by the particle in an orthogonal direction to the excitation laser, referred to as side-scatter (SSC), and the light emitted from fluorescent molecules in one or more detectors that measure signal over a range of spectral wavelengths, or by the fluorescent dye that is primarily detected in that specific detector or array of detectors. Different cell types can be identified by their light scatter characteristics and fluorescence emissions resulting from labeling various cell proteins or other constituents with fluorescent dye-labeled antibodies or other fluorescent probes.

Isolation of biological particles has been achieved by adding a sorting or collection capability to flow cytometers. Particles in a segregated stream, detected as having one or more desired characteristics, are individually isolated from the sample stream by mechanical or electrical removal. A common flow sorting technique utilizes drop sorting in which a fluid stream containing linearly segregated particles is broken into drops. The drops containing particles of interest are electrically charged and deflected into a collection tube by passage through an electric field. Typically, the linearly segregated particles in the stream are characterized as they pass through an observation point situated just below the nozzle tip. Once a particle is identified as meeting one or more desired criteria, the time at which it will reach the drop break-off point and break from the stream in a drop can be predicted. Ideally, a brief charge is applied to the fluid stream just before the drop containing the selected particle breaks from the stream and then grounded immediately after the drop breaks off. The drop to be sorted maintains an electrical charge as it breaks off from the fluid stream, and all other drops are left un-charged.

Occasionally, cell sorting is carried out in contained environment in order to regulate the gasses to which certain sorted cells are exposed. Anaerobic microorganisms, for example, cannot be sorted via standard flow cytometric techniques due to their intolerance to oxygen. Cell sorting must therefore be carried out under anoxic conditions in which the contained environment is devoid of oxygen. Conventionally, the generation of such a contained environment involves placing an existing sorting flow cytometer into a closed-system chamber and/or modifying existing flow cytometer components, e.g., as described in a prior patent by Venter et al. in U.S. Pat. No. 9,556,413.

SUMMARY

Because approaches for controlling the gaseous environment in which particles are sorted and collected require the substantial modification of instrument components or the relocation of a cell sorter to a larger contained environment, the inventors have realized that systems and methods for sorting particles within a closed system while simplifying flow cytometer design are consequently required. Embodiments of the invention satisfy this and other needs.

Aspects of the invention include closed-system sorting flow cytometer adapters for converting a sorting flow cytometer having a sort block into a closed-system sorting flow cytometer. Embodiments of the subject adapter are configured to generate a contained environment in order to regulate the gasses to which sorted particles are exposed by gaseously connecting the internal environments of the flow cytometer and the adapter. Adapters of interest include a sort block coupler for operably connecting to the sort block, an external chamber, and a connector for gaseously coupling the sort block to the external chamber. The connector may, in certain instances, include a flexible material (e.g., rubber, silicone) so as to allow the position of the external chamber to be adjusted relative to the sorting flow cytometer. In some cases, adapters further include a sort bucket in cellular-receiving relationship with the sort block coupler. Embodiments of the sort bucket include a plurality of collection vessels for collecting droplets received from the sort block. In other embodiments, a sort bucket is not present in the adapter. In such embodiments, the sort block coupler may be configured to house a plurality of collection vessels for collecting droplets received from the sort block. Some variations of the sort block coupler may include a sliding door for accessing the interior of the sort block coupler and sealing off the interior, when desired (e.g., during removal from the adapter). In certain instances, the adapter is equipped with means for regulating the gas content of the closed system. For example, embodiments of the adapters include one or more gas inlet ports for filling the closed system with a first gas (e.g., nitrogen, carbon dioxide, hydrogen, argon, etc.). Embodiments of the adapters may further include one or more gas relief valves for allowing a second gas (e.g., oxygen) to escape from the closed system.

Aspects of the invention further include flow cytometers having closed-system sorting flow cytometer adapters. Sorting flow cytometers of interest include an illumination source for illuminating a flow cell at an interrogation point, one or more detectors for receiving light from the interrogation point, and a sort block in liquid-receiving relationship with the flow cell. Sort blocks of interest are configured to selectively deflect charged particle droplets into one or more different collection vessels, as desired. Adapters for use in the present flow cytometers include a sort block coupler operably connected to the sort block, an external chamber, and a connector gaseously coupling the sort block to the external chamber. The connector may, in certain instances, include a flexible material (e.g., rubber, silicone) so as to allow the position of the external chamber to be adjusted. In some cases, adapters for use in the present flow cytometers further include a sort bucket in cellular-receiving relationship with the sort block coupler. Embodiments of the sort bucket include a plurality of collection vessels for collecting droplets received from the sort block. In other embodiments, a sort bucket is not present in the adapter. In such embodiments, the sort block coupler may be configured to house a plurality of collection vessels for collecting droplets received from the sort block. In certain instances, flow cytometers are equipped with means for regulating the gas content of the closed system. In such instances, the sort block and adapter (e.g., sort block coupler, sort bucket, external chamber) may include one or more gas inlet ports and one or more gas relief valves. Embodiments of the subject flow cytometers also include a compressor gaseously coupled to the one or more gas inlet ports that is configured to fill the closed system with a first gas (e.g., nitrogen, carbon dioxide, hydrogen, argon, etc.). In certain cases, flow cytometers include a gas sensor configured to assess the concentration of a second gas (e.g., oxygen) within the closed system. Where flow cytometers include a gas sensor, the sensor may be operably connected to the compressor such that the compressor regulates the concentration of the second gas based on the assessment from the gas sensor. In some instances, the instant flow cytometers include one or more internal doors configured to permit the flow of gas between the sort block and external chamber when the internal door is open and prevent the flow of gas between the sort block and external chamber when the internal door is closed.

Aspects of the invention further include methods for assembling a closed-system sorting flow cytometer and analyzing a sample in a closed-system flow cytometer. In some cases, methods include operably connecting a closed-system sorting flow cytometer adapter to a sorting flow cytometer having a sort block. Methods of interest further include introducing particles from a sample into a sorting flow cytometer having an illumination source for illuminating a flow cell at an interrogation point, a detector for receiving light from the interrogation point, a sort block in liquid-receiving relationship with the flow cell and a closed-system sorting flow cytometer adapter in droplet-receiving relationship with the sort block.

BRIEF DESCRIPTION OF THE FIGURES

The invention may be best understood from the following detailed description when read in conjunction with the accompanying drawings. Included in the drawings are the following figures:

FIG. 3A-B depict alternate views of a sorting flow cytometer having a closed-system flow cytometer adapter in an unexpanded configuration according to certain embodiments.

DETAILED DESCRIPTION

Figure 1A:
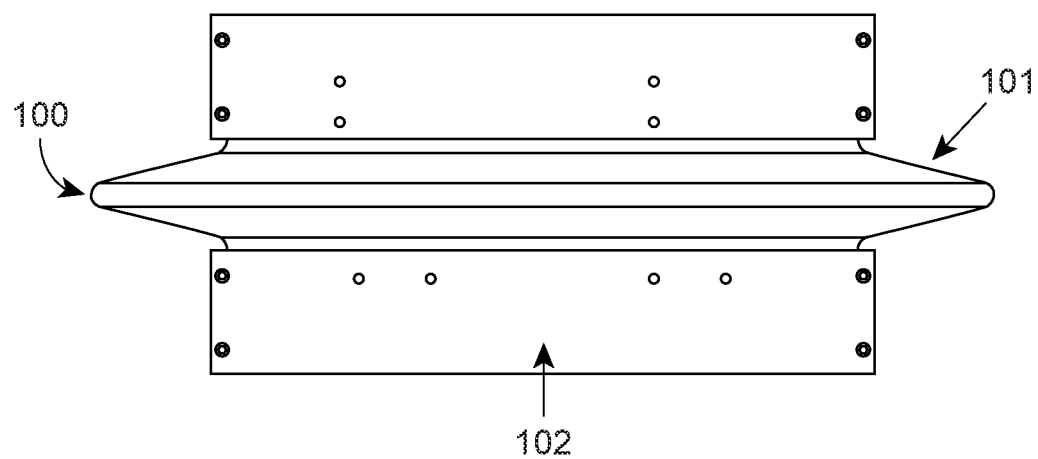
FIG. 1A-B depict alternate views of an unexpanded (FIG. 1A) and an expanded (FIG. 1B) connector for gaseously coupling a sort block to an external chamber according to certain embodiments.
Figure 1A:
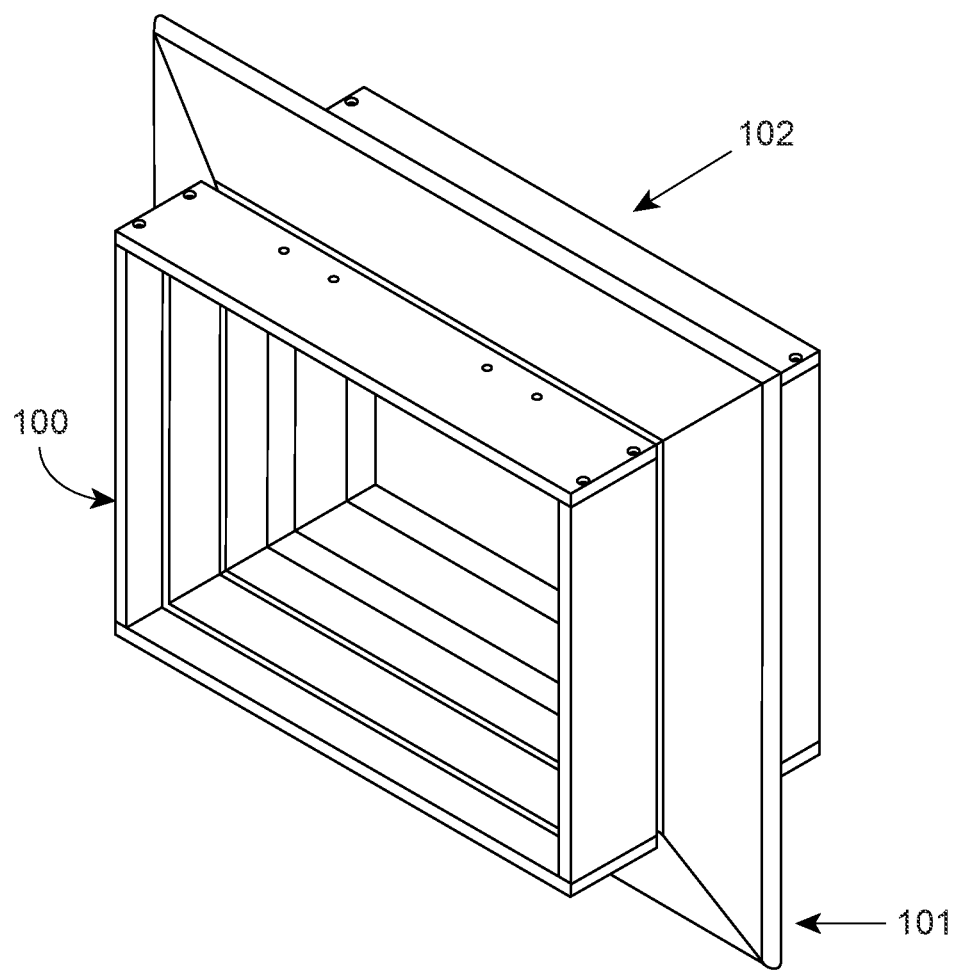

Closed-system sorting flow cytometer adapters for converting a sorting flow cytometer having a sort block into a closed-system sorting flow cytometer are provided. Adapters of interest include a sort block coupler for operably connecting to the sort block, an external chamber, and a connector for gaseously coupling the sort block to the external chamber, optionally via a sort bucket that is in cellular-receiving relationship with the sort block coupler. Flow cytometers having closed-system sorting flow cytometer adapters as well as gas inlet ports for regulating the internal environment of the closed system are also disclosed. Methods, computer systems and kits for carrying out the invention are additionally provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the system and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

Closed-System Sorting Flow Cytometer Adapters

As discussed above, aspects of the invention include closed-system sorting flow cytometer adapters. Adapters of interest are configured to convert an existing sorting flow cytometer into a closed-system sorting flow cytometer. The term "sorting" is used herein in its conventional sense to refer to separating components (e.g., cells, non-cellular particles such as biological macromolecules) of the sample and in some instances, as described below, delivering the separated components to a receiving location having one or more collection vessels. For example, a sample to be sorted may include 2 or more components, such as 3 or more components, such as 4 or more components, such as 5 or more components, such as 10 or more components, such as 15 or more components and including soring a sample having 25 or more components. One or more of the sample components may be separated from the sample and delivered to a sample collection container, such as 2 or more sample components, such as 3 or more sample components, such as 4 or more sample components, such as 5 or more sample components, such as 10 or more sample components and including 15 or more sample components may be separated from the sample and delivered to a sample collection container at the receiving location.

A sorting flow cytometer having the subject adapter may be described as a "closed-system" sorting flow cytometer in which the interior environments of the components for particle sorting and collection are gaseously connected such that a single, contained, gaseous environment is formed between the components. In other words, the components within the closed system are not exposed to or have no contact with the outside environment. In some embodiments, the components contained within the closed system are isolated from the gaseous environment of the ambient environment (i.e., are not exposed to the gases outside of the closed system). In other embodiments, the components contained within the closed system are isolated from the fluidic environment of the ambient environment (i.e., are not exposed to any fluids present outside of the closed system). In yet other embodiments, the components contained within the closed system are sterile and are isolated from live bacteria or other microorganisms that are present in the ambient environment.

Adapters of the present disclosure are accordingly configured such that the internal environment of the closed system is regulatable in order to, for example, fill the closed system with a first gas and thereby evacuate a second gas from the closed system. Put another way, embodiments of the subject adapters generate a closed system existing within (i.e., inside) the particle sorting and collection instrumentation of the flow cytometer, as opposed to a closed system that surrounds the exterior of the instrumentation or the flow cytometer itself. In some cases, the adapters described herein streamline the generation of a closed system for cell sorting when compared to custom-built chambers. The adapters may also, in some instances, reduce the amount of space required for cell sorting within a contained environment as compared to conventional systems. In embodiments, the subject adapters simplify the process of sorting and collecting anaerobic microorganisms via the creation of an anoxic closed-system environment.

Closed-system sorting flow cytometer adapters of interest are in droplet-receiving relationship with a sort block of the sorting flow cytometer. As discussed herein, a "sort block" refers to a sorting flow cytometer apparatus for selectively diverting particle droplets to one or more collection vessels. Sort blocks may, for example, selectively apply a charge to a particle droplet and subsequently deflect that droplet to one of a series of possible sorting destinations. By "droplet-receiving relationship", it is meant that the closed-system sorting flow cytometer adapter is positioned with respect to the sort block such that particle droplets deflected by the sort block are received into the internal environment of the adapter. Embodiments of the adapter consequently include a sort block coupler for operably connecting the adapter to a sort block. Sort block couplers of interest are configured to connect to a distal surface of the sort block such that particle droplets may be passed from the sort block to the interior of the closed-system sorting flow cytometer adapter. The size of the sort block coupler may vary, as desired. In some instances, the length, width and height of the sort block coupler independently range from 0.1 cm to 30 cm, such as 0.5 cm to 25 cm, such as 0.75 cm to 20 cm, such as 1 cm to 15 cm, such as 1.5 cm to 10 cm and including 2 cm to 5 cm. The interior volume of the sort block coupler may similarly vary, and in some instances the volume ranges from 0.5 $cm^3$ to 27,000 $cm^3$, such as 0.75 $cm^3$ to 8,000 $cm^3$, such as 1 $cm^3$ to 3,500 $cm^3$, 3.5 $cm^3$ to 1,000 $cm^3$, and including 8 $cm^3$ to 125 $cm^3$.

Sort block couplers may further include one or more openings through which sorted droplets may pass through and thereby enter the interior of the sort block coupler. Openings of interest in the sort block coupler may be characterized by any convenient shape. e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the opening may also vary as desired. In some instances, the length and width of the opening independently range from 0.1 cm to 15 cm, such as from 0.25 cm to 10 cm, such as from 0.5 cm to 8 cm, such as from 0.75 cm to 5 cm and including from 1 cm to 3 cm. Where the opening to is circular, in some instances the opening may have a diameter that ranges from 0.1 cm to 20 cm, such as from 0.25 cm to 10 cm, such as from 0.5 cm to 8 cm, such as from 0.75 cm to 5 cm and including from 1 cm to 3 cm.

The sort block coupler may include any convenient mechanism for attaching to the sort block. Exemplary attachment mechanisms include, but are not limited to, clamps, magnets, latches, notches, countersinks, counterbores, grooves, pins, tethers, hinges, non-permanent adhesives, or a combination thereof. In certain cases, a portion of the sort block coupler is configured to slide into a distal portion of sort block. In such cases, the top of the sort block coupler may be slidably received into an existing hole positioned in the distal surface of the sort block possessing a complementary shape with respect to the coupler. For example, in certain instances, the sort block coupler includes one or more rails that may be slidably inserted into correspondingly sized grooves located in the distal portion of the sort block. In such instances, the sort block coupler may include any convenient number of rails, such as a single rail, 2 or more rails, 3 or more rails 4 or more rails, and including 5 or more rails, etc.

In some embodiments, sort block couplers further include a sealing mechanism by which one or more gasses are prevented from entering into or escaping from the closed system via the juncture between the sort block and the adapter. In such embodiments, the sort block coupler is configured to maintain a closed system existing between the interior of the sort block and the interior of the adapter. Any convenient gastight sealing mechanism may be employed in the subject sort block coupler. In some cases, the sealing mechanism includes a sealing gasket. As discussed herein, a "gasket" is referred to in its conventional sense to describe a device positioned between two objects for preventing fluid (e.g., liquid, gas) leakage from or into the joined objects. Sealing gaskets of interest may be composed of any suitable materials such as, for example, rubber (e.g., nitrile rubber), silicone, metal, cork, felt, neoprene, fiberglass, polytetrafluoroethylene, plastic polymer (e.g., polychlorotrifluoroethylene), or the like, as well as combinations thereof. Sealing gaskets for use in the sort block coupler may have any convenient form, such as, for instance, a sheet gasket, a jacketed gasket a spiral-wound gasket, a flange gasket, a kammprofile gasket, or the like.

Embodiments of the subject adapters also include a container configured to house one or more collection vessels for collecting droplets received from the sort block. In certain cases, the container includes a sort bucket in cellular-receiving relationship with the sort block coupler. As discussed herein, a "sort bucket" refers to a container inside which particle droplets deflected by the sort block are received into a plurality of collection vessels which may be accessed and/or removed from the sort bucket after the cessation of cell sorting. The sort bucket may be formed from any suitable material that is compatible with a fluidic sample (e.g., biological sample), including metal, glass (e.g., Pyrex glass, borosilicate glass), ceramic or plastic. In certain embodiments, the sort bucket formed from a plastic, such as a rigid plastic, polymeric or thermoplastic material. For example, suitable plastics may include, but are not limited to polycarbonates, polyvinyl chloride (PVC), polyurethanes, polyethers, polyamides, polyimides, or copolymers of these plastics, such as PETG (glycol-modified polyethylene terephthalate), among other polymeric plastic materials. By "cellular-receiving relationship" it is meant that the sort bucket is positioned relative to the sort block and the sort block coupler such that deflected droplets from the sort block pass through the sort block coupler and are received by one or more collection vessels. The size of the sort bucket may vary, as desired. In some instances, the length, width and height of the sort bucket independently range from 0.1 cm to 50 cm, such as 0.1 cm to 40 cm, such as 0.05 cm to 40 cm, such as 0.5 cm to 25 cm, and in some instances from 0.75 cm to 30 m, such as 0.75 cm to 20 cm, such as 1 cm to 15 cm, such as 1.5 cm to 12 cm and including 2 cm to 10 cm. The interior volume of the sort bucket may similarly vary, and in some instances the volume ranges from 1 $cm^3$ to 30,000 $cm^3$, such as 1.25 $cm^3$ to 8,000 $cm^3$, such as 1.5 $cm^3$ to 3,500 $cm^3$, 2 $cm^3$ to 1,000 $cm^3$, and including 8 $cm^3$ to 125 $cm^3$.

Embodiments of the sort bucket further include one or more openings through which sorted droplets may pass through and thereby enter the interior of the sort bucket. Openings of interest in the sort bucket may be characterized by any convenient shape. e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the opening may also vary, where in some instances the length and width of the opening independently range from 0.1 cm to 20 cm, such as from 0.1 cm to 15 cm, such as from 0.25 to 15 cm, such as from 0.25 cm to 10 cm, such as from 0.5 cm to 8 cm, such as from 0.75 cm to 5 cm and including from 1 cm to 3 cm. Where the opening to is circular, in some instances the opening may have a diameter that ranges from 0.1 cm to 20 cm, such as from 0.25 cm to 10 cm, such as from 0.5 cm to 8 cm, such as from 0.75 cm to 5 cm and including from 1 cm to 3 cm.

Where the subject adapters include a sort bucket, said sort bucket may be operably connected to the sort block coupler via any convenient mechanism. In some embodiments, the distal end of the sort block coupler includes one or more fasteners for attaching the sort block coupler to the sort bucket. Suitable fasteners may include, but are not limited to magnets, hook and loop fasteners, latches, notches, grooves, pins, tethers, hinges, non-permanent adhesives, or combinations thereof. In some cases, sort block couplers are operably attached to a sort bucket via a latch. In additional cases, the sort block coupler is operably attached to the sort bucket via a plurality of latches, such as 2 or more latches, 3 or more latches, 4 or more latches, 5 or more latches and including 6 or more latches. Latches of interest are configured to compress a surface of the sort block coupler against a surface of the sort bucket. Adapters of the present disclosure may further include one or more sealing mechanisms positioned between the sort block coupler and the sort bucket. In some instances, adapters include one or more sealing gaskets positioned between the sort block coupler and the sort bucket (e.g., such as the sealing gaskets described above). When the sort buckets described herein are operably connected in a sealing relationship with the sort block coupler, the interior environment of the sort buckets as well as the collection vessels contained therein may become components of the above-described closed system. As such, the gaseous environment within sort bucket may be regulatable (e.g., via the insertion or expulsion of certain gasses).

In other embodiments where the sort bucket is not present, the sort block coupler may be configured to house a plurality of collection vessels for collecting droplets received from the sort block. In such embodiments, the sort block coupler may serve as a receptacle for sorted droplets (i.e., instead of the sort bucket). In other words, in these embodiments, the sort block coupler is in droplet-receiving relationship with the sort block. In such cases where the sort block coupler is configured for droplet collection, said sort block coupler may possess a detachable relationship relative to the sort block so that the sort block coupler as well as its contents (e.g., sorted particle droplets) may be removed from the sorting flow cytometer. The sort block coupler may, in some instances, detach from and attach to the closed system such that the contained environment within the sort block coupler is maintained. Put another way, the interior of the sort block coupler is not exposed to undesirable elements (e.g., gasses, fluids, microbial contaminants) in the ambient environment. Any convenient mechanism for sealing the internal environment of the sort block coupler may be included. For example, embodiments of the sort block coupler involve a sliding door for accessing the interior of the sort block coupler. Where it is desirable to detach the sort block coupler from the closed system, the sliding door may be closed, thereby sealing the interior of the sort block coupler. The coupler and its contents may subsequently be removed and relocated. Conversely, where it is desirable to attach a sort block coupler having a sealed internal environment to the closed system of the adapter and sort block, the sort block coupler may be attached to the sort block (e.g., by sliding the sort block coupler into the sort block, as described above) and the sliding door may subsequently be opened, thereby incorporating the interior of the coupler and its contents into the closed system.

In certain embodiments, containers for collecting droplets received from the sort block (e.g., sort buckets, sort block couplers), may include any convenient number of collection vessels, such as 2 or more collection vessels, such as 3 or more collection vessels, such as 4 or more collection vessels, such as 5 or more collection vessels, such as 6 or more collection vessels, such as 10 or more collection vessels. For example, the number of collection vessels housed may range from 1 to 10, such as 2 to 8, and including 4 to 7. In certain instances, the container includes 6 collection vessels. Suitable collection vessels for collecting droplets from the flow stream may include, but are not limited to, test tubes, conical tubes, multi-compartment vessels such as microtiter plates (e.g., 96-well plates), centrifuge tubes, culture tubes, microtubes, caps, cuvettes, bottles, rectilinear polymeric vessels, and bags, among other types of vessels.

Each collection vessel includes an opening (i.e., empty space through which droplets pass) for receiving sorted droplets from the flow stream. In embodiments, the opening to each of the collection vessels may independently be separated from the longitudinal axis of the flow stream by a distance ranging from 0.001 mm to 100 mm, such as 0.01 mm to 90 mm, such as 0.1 mm to 80 mm, such as 0.5 mm to 70 mm, such as 1 mm to 60 mm and including 5 mm to 50 mm from the longitudinal axis of the flow stream. The opening to each of the collection vessels may independently be at a different angle with respect to the longitudinal axis of the flow stream, such as 0.01° to 90°, such as from 0.05° to 85°, such as from 0.1° to 80°, such as from 0.5° to 75°, such as from 10° to 70°, such as from 15° to 65°, such as from 20° to 60°, such as from 25° to 55° and including from 30° to 50°. The opening to each collection vessel may, in certain instances, include a cover, such as a valve, which can be reversibly closed as desired. For example, the opening to the collection vessel may include a valve which is configured to remain closed until a flow stream is detected. In still other instances, the opening to the collection vessel includes a valve that is configured to close after a predetermined period of time (e.g., to collect only droplets from a specific portion of a sample). In yet other instances, the opening to the collection vessel includes a valve which is configured to close after detecting that a predetermined volume has been collected. The size of the opening of each collection vessel may vary, each independently ranging from 0.1 cm to 5 cm, such as from 0.25 cm to 4.5 cm, such as from 0.5 cm to 4 cm, such as from 0.75 cm to 3.5 cm and including from 1 cm to 3 cm. Where the opening to the collection vessel is circular, the opening may have a diameter that ranges from 0.1 cm to 5 cm, such as from 0.25 cm to 4.5 cm, such as from 0.5 cm to 4 cm, such as from 0.75 cm to 3.5 cm and including a diameter from 1 cm to 3 cm.

In additional embodiments, closed-system sorting flow cytometer adapters further include an external chamber. The "external chamber" described herein may be any enclosed chamber that exists outside of the sorting flow cytometer and is configured to operably connect to the closed system. The shape of the external chamber may vary. In certain embodiments, the external chamber is cuboid or substantially cuboid in shape. For example, the external chamber may be shaped as a rectangular cube or a square cube. In other embodiments, the shape of the external chamber may be characterized by a sphere or cylinder. The size of the external chamber may vary, as desired, and in some instances the length, width and height of the external chamber independently range from 0.05 m to 5 m, such as 0.1 m to 4 m, such as 0.5 m to 3 m, and including 1 m to 2.5 m. The volume of the external chamber may also vary, and in some instances the volume ranges from 0.0001 $m^3$ to 125 $m^3$, such as 0.001 $m^3$ to 64 $m^3$, such as 0.125 $m^3$ to 27 $m^3$ and including 1 $m^3$ to 16 $m^3$.

The external chamber may include any number of rigid or pliant components, as desired. In some cases, the external chamber includes one or more rigid components, e.g., where the one or more rigid components define the external chamber. By "rigid" is meant that the components, e.g., walls, are unable to bend or be forced out of shape, such that they are not flexible. Rigid components of interest for use in the external chamber include metal and plastic. In certain instances, external chambers include one or more metal components including, for example, aluminum, titanium, brass, iron, lead, nickel, steel (e.g., stainless steel), copper, tin as well as combinations and alloys thereof. In additional embodiments, external chambers include one or more rigid plastic materials such as, for example, polycarbonates, polyvinyl chloride (PVC), polyurethanes, polyethers, polyamides, polyimides, or copolymers of these plastics, such as PETG (glycol-modified polyethylene terephthalate), among other polymeric plastic materials.

External chambers of interest may further include one or more pliant components. By "pliant" it is meant that a portion of the external chamber may be bent or flexed from its original shape without any significant structural changes, such as tearing, cracking, perforating, etc. For example, a pliant external chamber may be flexed and/or deformed from its original shape, while still maintaining a sealed barrier preventing contact between a fluid (e.g., gas, liquid) inside the external chamber and the surrounding environment. In some embodiments, the pliant material includes a vinyl material such as, for example, polyvinyl chloride (PVC), polyvinyl fluoride (PVF), ethyl vinyl acetate (EVA), and the like. In some cases, the pliant material possesses a thickness of 5 mm or less, such as 3 mm or less, such as 2 mm or less, including 1 mm or less, or 0.5 mm or less, such as 0.4 mm or less, such as 0.3 mm or less, such as 0.2 mm or less and including 0.1 mm or less. In certain embodiments, the pliant material is formed from a flexible material having a Young's modulus of 1 GPa or less, such as 0.9 GPa or less, such as 0.8 GPa or less, such as 0.7 GPa or less, such as 0.6 GPa or less, such as 0.5 GPa or less, such as 0.4 GPa or less, such as 0.3 GPa or less, such as 0.2 GPa or less, such as 0.1 GPa or less and including 0.01 GPa or less. Embodiments of the external chamber may also include one or more plastic materials such as polyethylene, polypropylene, combinations thereof, and the like. In certain embodiments, the pliant material is clear such that the interior of the external chamber may be viewable from the outside. In other embodiments, the pliant material is opaque such that light from outside the external chamber does not penetrate the pliant material, such as where it is desirable to manipulate light-sensitive samples within the external chamber.

Any convenient arrangement of rigid and pliant materials may be included in the subject external chamber. In some instances, the external chamber is entirely rigid. In other instances, the external chamber is entirely pliant. In still other instances, the external chamber includes a combination of rigid and pliant materials. For example, in certain cases, the external chamber includes a rigid skeleton defining the boundaries of the external chamber and sheets of pliant material between the members of the rigid skeleton. Examples of available chambers that may be adapted for use in the subject external chamber include benchtop biocontainment enclosures such as those manufactured by bioBUBBLE, Inc. In some instances, the external chamber functions as a glovebox. In such instances, gloves may be built into one or more walls of the external chamber so that a user may manipulate the contents of the external chamber without compromising the integrity of the closed system. Embodiments of the external chamber may further include a means for removing one or more objects from the external chamber, when desired. For example, in some instances where the external chamber includes a pliant material, the material may include a zipper that reversibly creates an opening in the wall of the external chamber.

Aspects of the present closed-system sorting flow cytometer adapter further include a connector for gaseously coupling the sort block to the external chamber. A sort block and external chamber may be described as "gaseously coupled" where the interior environments of the sort block and external chamber are parts of the same closed system. In other words, gas within the interior environments of each of the sort block and the external chamber—as well as other intermediate components of the closed system (e.g., sort block coupler, sort bucket)—may travel freely between the components while remaining separate from the ambient environment. Embodiments of the subject connector, therefore, provide a conduit through which gas may be exchanged throughout the relevant components. In additional cases, the connector provides a conduit through which collection vessels (e.g., containing sorted droplets) may be accessed from the container for collecting droplets (e.g., sort bucket, sort block coupler).

The connector described herein may be fashioned out of any convenient material. In some instances, the connector includes flexible material. Flexible materials of interest include those that may change shape or size without compromising the integrity or gas permeability of the material. Accordingly, embodiments of the connector include a non-porous material that does not permit the exchange of gas therethrough (i.e., so that gas from the ambient surroundings does not unintentionally impinge on the closed system). For example, in some embodiments, the connector may include one or more elastomer (i.e., rubber) materials such as, but not limited to, polyisoprene, polybutadiene, neoprene, butyl rubber, styrene-butadiene, nitrile rubber, ethylene propylene, silicone, fluroroelastomer, polyether block amide, ethylene vinyl acetate, or the like. In certain embodiments, the flexible material included in the connector includes silicone. In additional embodiments, the connector may include a rigid material such as a rigid metal or plastic (e.g., such as those described above).

In some cases, the subject connector includes a means for attaching the connector to other components of the closed-system sorting flow cytometer adapter so that a closed-system may be achieved. For example, where the adapter includes a sort bucket, embodiments of the connector include a collar for attaching the connector to the sort bucket. In addition, embodiments of the connector include a collar for attaching the connector to the external chamber. The collar described herein may be any convenient element for creating an interface between the connector and a relevant component of the adapter (e.g., sort bucket, sort block coupler, external chamber). In some embodiments, the collar is a rigid collar. In such embodiments, the rigid collar may be attached to the relevant adapter component via a plurality of screws. In further embodiments, the connector is configured for attachment via a plurality of latches. In some cases, the connector includes a sealing compound for generating a seal around the edges of the collar and thereby preventing gasses from unintentionally impinging on the closed system. Any convenient sealing compound may be included, such as but not limited to silicone, rubber, non-porous foam, or any other gasket material, as desired. In some embodiments, the sealing compound includes silicone. The connector and its constituent collar(s) may possess any convenient cross-sectional shape. In some instances, the connector and collars possess a rectangular cross-sectional shape. In other embodiments, the connector and collars possess a square cross-sectional shape. In still other embodiments, the connector and collars possess a circular cross-sectional shape.

The external chamber may possess any convenient orientation relative to the sort block coupler and/or sort bucket. As discussed above, the sort bucket and/or sort block are configured to collect particle droplets sorted from a flow stream. Said flow stream may be conceptualized as having an imaginary longitudinal axis along which liquid flows. Accordingly, in some embodiments, the external chamber is positioned at a separate location relative to the flow stream, i.e., a portion of the external chamber is not intersected by the longitudinal axis of the flow stream. In such embodiments, the external chamber may be located at any convenient latitudinal distance from the longitudinal axis of the flow stream, such as where the distance ranges from 0.01 m to 2 m, such as 0.1 m to 1.5 m, and including 0.5 m to 1 m. In certain cases where the connector includes a flexible material, the location of the external chamber may be adjusted relative to other components of the adapter. For example, the external chamber may, in some cases, be relocated closer to or further away from the sort bucket (where such is included in the adapter) relative to the original location of the external chamber. In such cases, the connector may be configured to contract or expand depending on the positioning of the external chamber. In some cases, the connector may contract and expand in an "accordion-like" fashion where the connector possesses folds that flatten out as the connector is expanded. In additional instances, the connector may be configured such that the external chamber may be moved in a lateral direction relative to the sort block coupler and/or sort bucket. In such instances, the pliability of the connector permits movement of the external chamber relative to the sort block coupler and/or sort bucket in a "side-to-side" (i.e., lateral) direction thereby providing additional flexibility in the location of the external chamber.

Figure 1B:
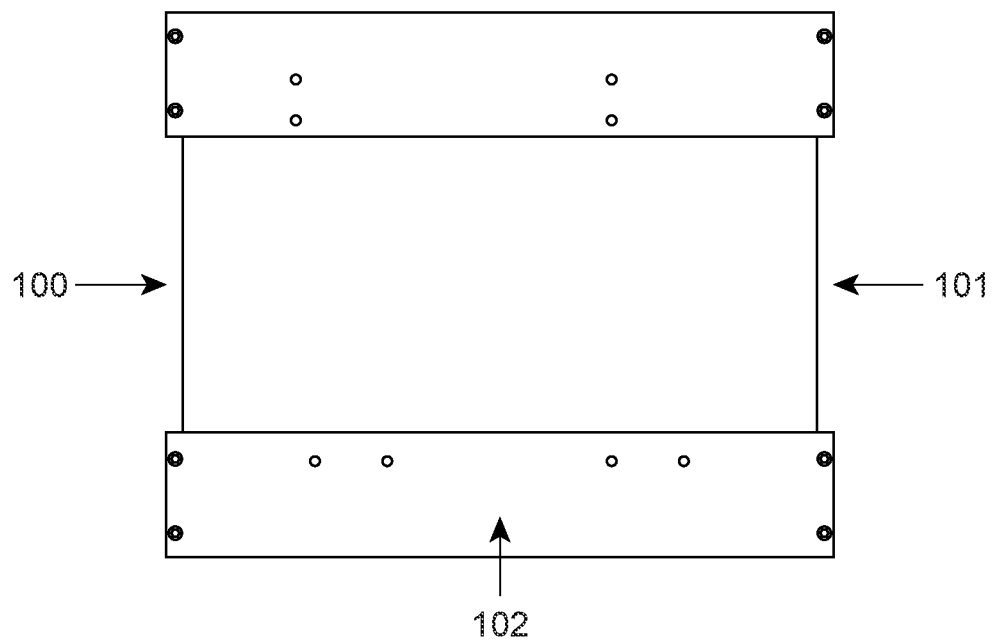
Figure 1B:
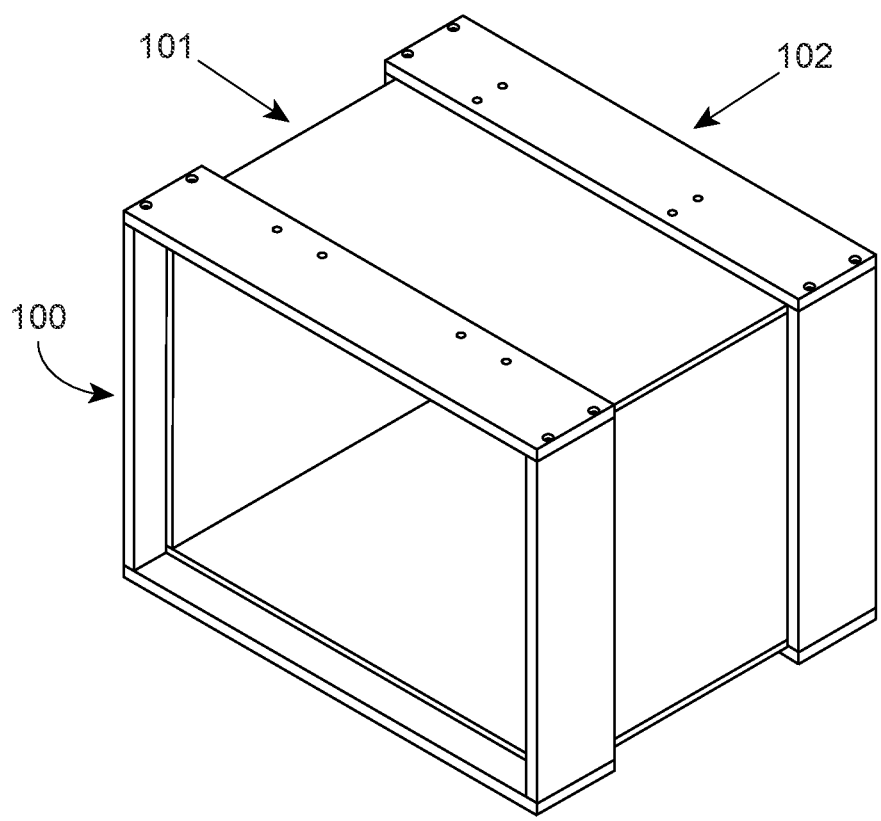

FIG. 1A-B depicts a connector according to certain embodiments of the closed-system sorting flow cytometer adapter. As shown in FIG. 1A, connector 100 is depicted in an unexpanded configuration, and includes a flexible portion 101 as well as rigid collars 102 positioned on either side. As shown in FIG. 1B, connector 100 is depicted in an expanded configuration.

As discussed above, the subject adapter is configured to generate a closed system within a sorting flow cytometer. In certain embodiments, the closed-system is a positive pressure system. As discussed herein, a "positive pressure system" is referred to in its conventional sense to describe a system in which internal pressure is higher than the ambient pressure surrounding the system. In other embodiments, the closed system is a negative pressure system. As discussed herein, a "negative pressure system" is referred to in its conventional sense to describe a system in which internal pressure is lower than the ambient pressure surrounding the system.

Where the closed system is a positive pressure system, the subject adapter may include one or more gas inlet ports for filling the closed system with a first gas. In some embodiments, adapters include a single gas inlet port. In other embodiments, adapters include a plurality of gas inlet ports such as, for example, 1 or more gas inlet ports, such as 2 or more, 3 or more, 4 or more, 5 or more, 6 or more, 8 or more, 9 or more and including 10 or more gas inlet ports. Gas inlet ports may be positioned in one or more different locations throughout the closed-system flow cytometer adapter, as desired. For example, in some cases, the adapter includes a gas inlet port positioned in a wall of the external chamber. In some cases where the adapter includes a sort bucket, the adapter includes a gas inlet port positioned in a wall of the sort bucket. In additional cases, the adapter includes a gas inlet port positioned in a wall of the sort block coupler. Gasses for filling the closed system include those that create suitable conditions for cultivating and sorting microorganisms, such as anaerobic microorganisms, and include but are not limited to nitrogen, carbon dioxide, hydrogen, and argon. In certain cases, the first gas includes nitrogen.

In further embodiments, the subject adapter includes one or more gas relief valves for allowing a second gas to escape from the closed system. In some instances, adapters include a single gas relief valve. In other instances, adapters include a plurality of gas relief valves such as, for example, 1 or more gas relief valves, such as 2 or more, 3 or more, 4 or more, 5 or more, 6 or more, 7 or more, 8 or more, 9 or more and including 10 or more gas relief valves. Gas relief vales may be positioned in one or more different locations throughout the close-system flow cytometer adapter, as desired. For example, in some cases, the adapter includes a gas relief valve positioned in a wall of the external chamber. In some cases where the adapter includes a sort bucket, the adapter includes a gas relief valve positioned in a wall of the sort bucket. In additional cases, the adapter includes a gas inlet port positioned in a wall of the sort block coupler. In some embodiments, second gasses evacuated from the external chamber are those that are displaced by the one or more first gasses inserted into the closed system via the one or more gas inlet ports. For example, in some cases, second gasses evacuated from the closed system include oxygen.

In some embodiments, the subject adapter includes one or more compartment sealing devices, e.g., doors, configured to regulate the flow of gas within the closed system. The compartment sealing devices described herein possess open and closed states. In the open state, the compartment sealing device is configured to permit the flow of gas between the sort block and the external chamber. In the closed state, the compartment sealing device is configured to prevent the flow of gas between the sort block and the internal chamber. For example, in some embodiments, the subject compartment sealing device may take the form of an internal door. In certain cases, the adapter includes a single internal door. In other cases, the adapter includes a plurality of internal doors such as, for example, 1 or more internal doors, 2 or more, 3 or more, 4 or more, 5 or more, 6 or more, 7 or more, 8 or more, 9 or more and including 10 or more internal doors. Internal doors may be positioned at one or more different locations throughout the adapter. For example, in one embodiment, an internal door is positioned in the sort bucket. In an additional embodiment where the adapter includes a sort bucket, the sort bucket includes a plurality of internal doors, e.g., one at the interface with the sort block coupler and another at the interface with the connector. In some cases, an internal door is positioned in the external chamber, such as where the internal door is positioned at the interface between the external chamber and the connector. In certain instances, an internal door is positioned within the sort block coupler. In some embodiments where the closed-system sorting flow cytometer and the adapter include one or more internal doors, components of the sorting flow cytometer and adapter may be removed while the integrity of the closed system is maintained.

Figure 2:
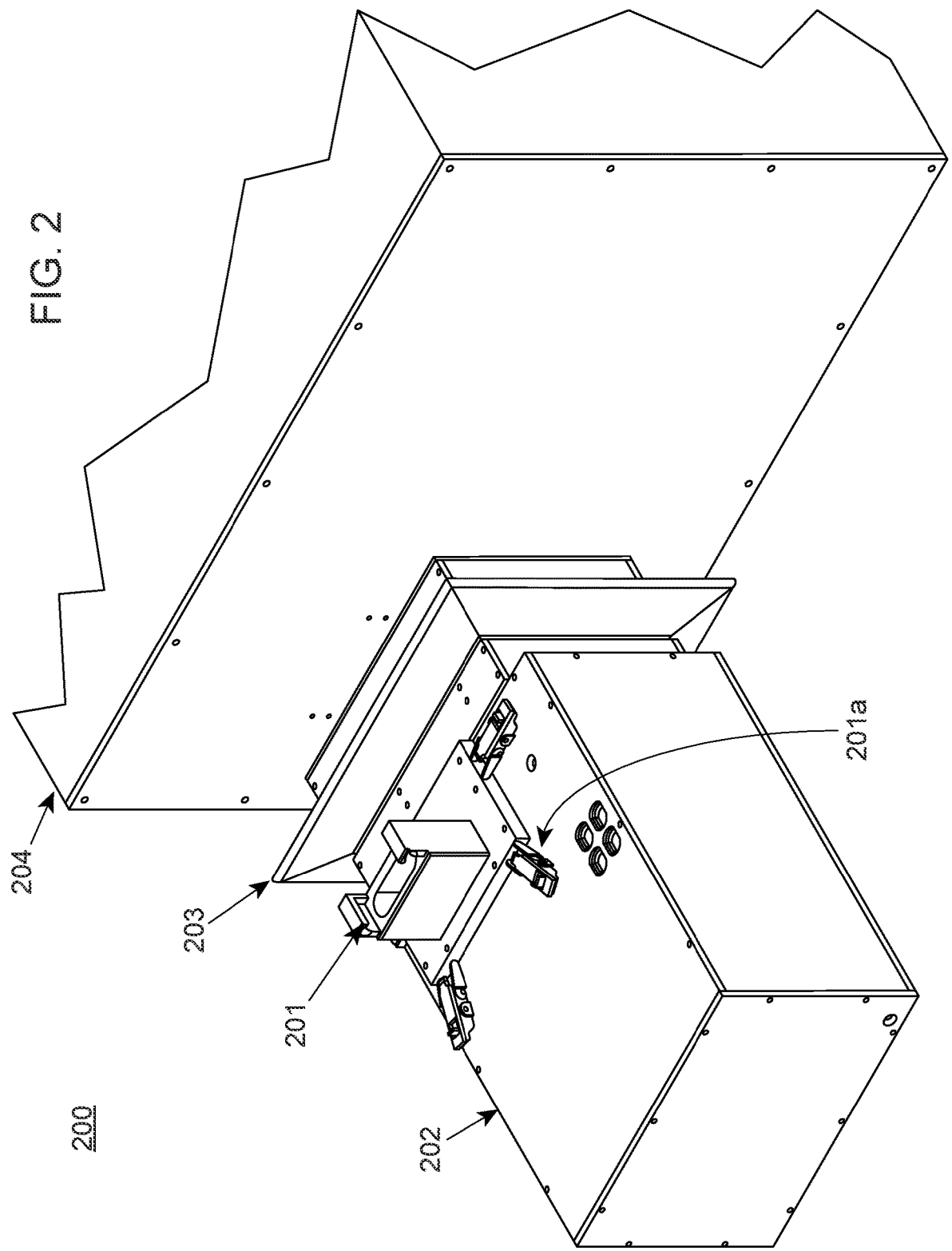
FIG. 2 depicts a closed-system sorting flow cytometer adapter according to certain embodiments.

FIG. 2 presents an embodiment of the closed-system sorting flow cytometer adapter. In the embodiment shown in FIG. 2, adapter 200 includes sort block coupler 201, sort bucket 202, connector 203, and external chamber 204. Sort block coupler 201 is configured to slide onto a distal portion of a sort block (not shown), and is attached to a top portion of sort bucket 202 via a plurality of latches 201a. Sort bucket 202 is configured to receive sorted droplets from the sort block (e.g., in one or more collection vessels) and is attached to external chamber 204 via connector 203. The position of external chamber 204 may be adjusted relative to sort bucket 202 due to the flexibility of connector 203.

Flow Cytometers Including Closed-System Sorting Flow Cytometer Adapters

As described above, aspects of the invention include sorting flow cytometers having an illumination source, a detector, a sort block in liquid-receiving relationship with the flow cell, and a closed-system flow cytometer adapter in droplet-receiving relationship with the sort block. Sorting flow cytometers of the present disclosure are closed system sorting flow cytometers. In other words, adapters and sort blocks of the subject sorting flow cytometers possess gaseously connected and regulatable internal environments.

As discussed herein, a "flow cell" is described in its conventional sense to refer to a component, such as a cuvette, containing a flow channel having a liquid flow stream for transporting particles in a sheath fluid. Cuvettes of interest include containers having a passage running therethrough. The flow stream may include a liquid sample injected from a sample tube. Flow cells of interest include a light-accessible flow channel. In some instances, the flow cell includes transparent material (e.g., quartz) that permits the passage of light therethrough. In some cases, the flow cell is configured for irradiation with light from a light source at an interrogation point. The "interrogation point" discussed herein refers to a region within the flow cell in which the particle is irradiated by light from the light source, e.g., for analysis. The size of the interrogation point may vary as desired. For example, where 0 μm represents the axis of light emitted by the light source, the interrogation point may range from −100 μm to 100 μm, such as −50 μm to 50 μm, such as −25 μm to 40 μm, and including −15 μm to 30 μm.

As discussed above, flow cytometers of the present disclosure include a sort block. In embodiments, sort blocks are in liquid-receiving relationship with the flow cell. By "liquid-receiving relationship" it is meant that particle droplets emitting from a distal portion of the flow cell (e.g., nozzle) are received into the sort block for sorting. Sort blocks of interest are configured to deliver sorted droplets to a container (e.g., sort bucket, sort block coupler) within the adapter. In some cases, sort blocks are configured for internal environment regulation. In such embodiments, the sort block may include one or more means for inserting and/or releasing gasses. For example, in certain instances, the sort block includes a gas inlet port for filling the closed system with a first gas (e.g., nitrogen, carbon dioxide, hydrogen, argon). In additional instances, the sort block includes a gas relief valve for allowing a second gas to escape from the closed system. The sort block may be any sort block known in the art such as, e.g., the sort block described in U.S. Pat. Nos. 6,880,414, 7,880,108, and U.S. Patent Publication No. 2019/0331657, the disclosures of which are herein incorporated by reference in their entirety. Sort blocks may, in some instances, be found in sorting flow cytometers commercially sold by Becton, Dickinson and Company ("BD"). In certain embodiments, the sort blocks are used in flow cytometry systems such as the BD Biosciences FACSCanto™ flow cytometer, BD Biosciences FACSVantage™, BD Biosciences FACSort™, BD Biosciences FACSAria™, BD Biosciences FACSCount™, BD Biosciences FACScan™, and BD Biosciences FACSCalibur™ systems, a BD Biosciences Influx™ cell sorter, or the like.

In embodiments, sort blocks include a droplet deflector that is configured to divert droplets containing analyzed cells from a stream of droplets produced from the flow stream emanating from the flow nozzle to a receiving location. Diversion of a droplet of interest to a receiving location may be achieved by droplet deflector via electrostatic charging of the droplet and deflection of the charged droplet from the flow stream by the application of an electrostatic field. Such electrostatic fields may be created by deflection plates positioned adjacent to the flow stream. As used herein, the terms "deflection" or "deflected" refer to the electrostatic deflection of droplets of interest from an analyzed flow stream of droplets, such that the cells may be identified and tracked in the flow stream and only those droplets of the flow stream that include those cells of interest are diverted and collected by a collection vessel. In some instances, the sort block includes deflection plates that are configured to deflect a single droplet into each collection vessel.

Deflection plates in sort blocks of interest may be configured based on the type of cells being sorted, the rate of sorting, the applied voltage to the cells as well as the number of components being sorted in the sample. In embodiments, the length of suitable deflection plates may range from 5 mm to 100 mm, such as from 6 mm to 90 mm, such as from 7 mm to 80 mm, such as from 8 mm to 70 mm, such as from 9 mm to 60 mm and including from 10 mm to 50 mm. The width of the deflection plates may vary, ranging from 1 mm to 25 mm, such as from 2 mm to 20 mm, such as from 3 mm to 15 mm and including from 5 mm to 10 mm. The distance between each deflection plate may vary depending on the applied voltage as well as the size of the particles being sorted in the flow stream. In some embodiments, the distance between each deflection plate may be 1 mm or more, such as 2 mm or more, such as 3 mm or more, such as 4 mm or more, such as 5 mm or more and including 10 mm or more. For example, the distance between each deflection plate may range from 1 mm to 25 mm, such as from 2 mm to 22.5 mm, such as from 3 mm to 20 mm, such as from 4 mm to 17.5 mm and including from 5 mm to 15 mm. The deflection plates may also be oriented at an angle to each other, such as an angle from 15° to 75°, such as from 20° to 70°, such as from 25° to 65° and including at an angle of from 30° to 60°.

The voltage applied to deflection plates to divert charged particles may be 10 mV or more, such as 25 mV or more, such as 50 mV or more, such as 100 mV or more, such as 250 mV or more, such as 500 mV or more, such as 750 mV or more, such as 1000 mV or more, such as 2500 mV or more, such as 5000 mV or more and including 10000 mV or more. In certain embodiments, the applied voltage to the deflection plates ranges from 0.001 V to 6000 V, including 0.001 V to 5000 V, such as from 0.01 V to 4000 V, such as from 0.1 V to 3000 V, such as from 1 V to 2000 V, such as from 5 V to 1500 V, such as from 10 V to 1000 V, such as from 25 V to 750 V and including from 100 V to 500 V.

The deflection plates are configured to divert particles from the flow stream to a receiving location downstream from the deflection plates. In embodiments, the deflection plates may divert each particle by an angle that varies. In some embodiments, the deflection plates are configured to deflect each particle by an angle of 0.5 degrees or more from the longitudinal axis of the flow stream, such as 1 degree or more, such as 1.5 degrees or more, such as 2 degrees or more, such as 2.5 degrees of more, such as 3 degrees or more, such as 5 degrees or more, such as 7.5 degrees or more and including deflecting each particle by an angle of 10 degrees or more from the longitudinal axis of the flow stream. For example, each particle may be diverted from the longitudinal axis of the flow stream by an angle from 0.1 degrees to 30 degrees, such as from 0.5 degrees to 25 degrees, such as from 1 degree to 20 degrees, such as from 2 degrees to 15 degrees and including from 5 degrees to 10 degrees.

Particles in the flow stream may be deflected by any convenient deflection plate protocol, including but not limited to cell sorting deflection plates as described in U.S. Pat. Nos. 3,960,449; 4,347,935; 4,667,830; 5,245,318; 5,464,581; 5,483,469; 5,602,039; 5,643,796; 5,700,692; 6,372,506 and 6,809,804, 7,880,108 the disclosures of which are herein incorporated by reference in their entirety. In certain embodiments, the deflection plates include charged plates for sorting cells in the flow stream as used in flow cytometry systems such as the BD Biosciences FACSCanto™ flow cytometer, BD Biosciences FACSVantage™, BD Biosciences FACSort™, BD Biosciences FACSAria™, BD Biosciences FACSCount™, BD Biosciences FACScan™, and BD Biosciences FACSCalibur™ systems, a BD Biosciences Influx™ cell sorter, or the like.

Sorting flow cytometers of interest further include a closed-system flow cytometer adapter in droplet-receiving relationship with the sort block. As discussed in detail above, the present adapters include a sort block coupler operably connected to the sort block, an external chamber, and a connector gaseously coupling the sort block to the external chamber, optionally via a sort bucket that is in cellular-receiving relationship with the sort block coupler. Where the adapters include a sort bucket, said sort bucket may be configured to house a plurality of collection vessels for collecting droplets received from the sort block. Where the adapters do not include a sort bucket, embodiments of the adapters may include a sort block coupler that is configured to house a plurality of collection vessels for collecting droplets received from the sort block. In certain embodiments, adapters include one or more gas inlet ports and one or more gas relief valves present within components (e.g., sort bucket, external chamber) of the adapter.

In some embodiments, sorting flow cytometers further include means for regulating the closed system formed by coupling the adapter to the sort block. In such embodiments, sorting flow cytometers may include a compressor gaseously connected to one or more gas inlet ports present within the adapter and/or sort block. Any convenient gas compressor for filling a closed system with a pressurized first gas may be employed as the compressor described herein. Compressors may be configured to fill the closed system with a single first gas or a plurality of gasses. For example, compressors may be configured to fill the closed system with nitrogen, carbon dioxide, hydrogen, argon, or the like, and combinations thereof. In some embodiments, the compressor is gaseously connected to a gas source from which the compressor may draw to fill the closed system. For example, flow cytometers may include a nitrogen gas source, a carbon dioxide gas source, an argon gas source, or the like. In certain cases, flow cytometers include any number of different gas sources (e.g., both a nitrogen gas source and a carbon dioxide gas source). In some instances, the gas source exists in the form of a pressurized cannister having the first gas located therein. In other embodiments, the compressor is configured to generate the first gas (i.e., a dedicated gas source is not required). For example, the compressor may be configured to extract the first gas (e.g., nitrogen) from the ambient surroundings and fill the closed system with the extracted first gas. In certain embodiments, the compressor is configured to fill the closed system with the first gas at a pressure ranging from greater than zero psi (e.g., 0.1 psi) to 100 psi, such as 1 psi to 60 psi and including 5 psi to 40 psi. Commercially available compressors configured to extract a first gas from ambient surroundings that may be adapted for use in the present sorting flow cytometers include, but are not limited to, the Portable Nitrogen Generator 2700-99 manufactured by Terra Universal.

The compressor may be gaseously coupled to the one or more gas inlet ports via any convenient mechanism. For example, in some cases, the compressor is gaseously connected to the one or more gas inlet ports via a flexible hose. The flexible hose may connect to the compressor and gas inlet port by an attachment device including, but not limited to, clamps, magnets, hook and loop fasteners, latches, notches, countersinks, counter-bores, grooves, pins, tethers, hinges, non-permanent adhesives or a combination thereof.

Embodiments of the sorting flow cytometers further include a gas sensor configured to assess the concentration of the second gas within the closed system. In some cases, the gas sensor is configured to assess the concentration of oxygen within the closed system. The subject gas sensor may be positioned at any convenient location within the adapter or sort block. In certain instances, the compressor is operably connected to the gas sensor and is configured to regulate the concentration of the second gas (e.g., oxygen) within the closed system based on the assessment from the gas sensor. In other words, the compressor may be configured to displace more or less of the second gas with the first gas based on the assessed amount of second gas. A user may, in some cases, input a value for a desired concentration of second gas within the closed system, and the gas sensor may induce the compressor to adjust the actual amount of second gas such that it resembles the inputted desired amount.

Figure 3B:
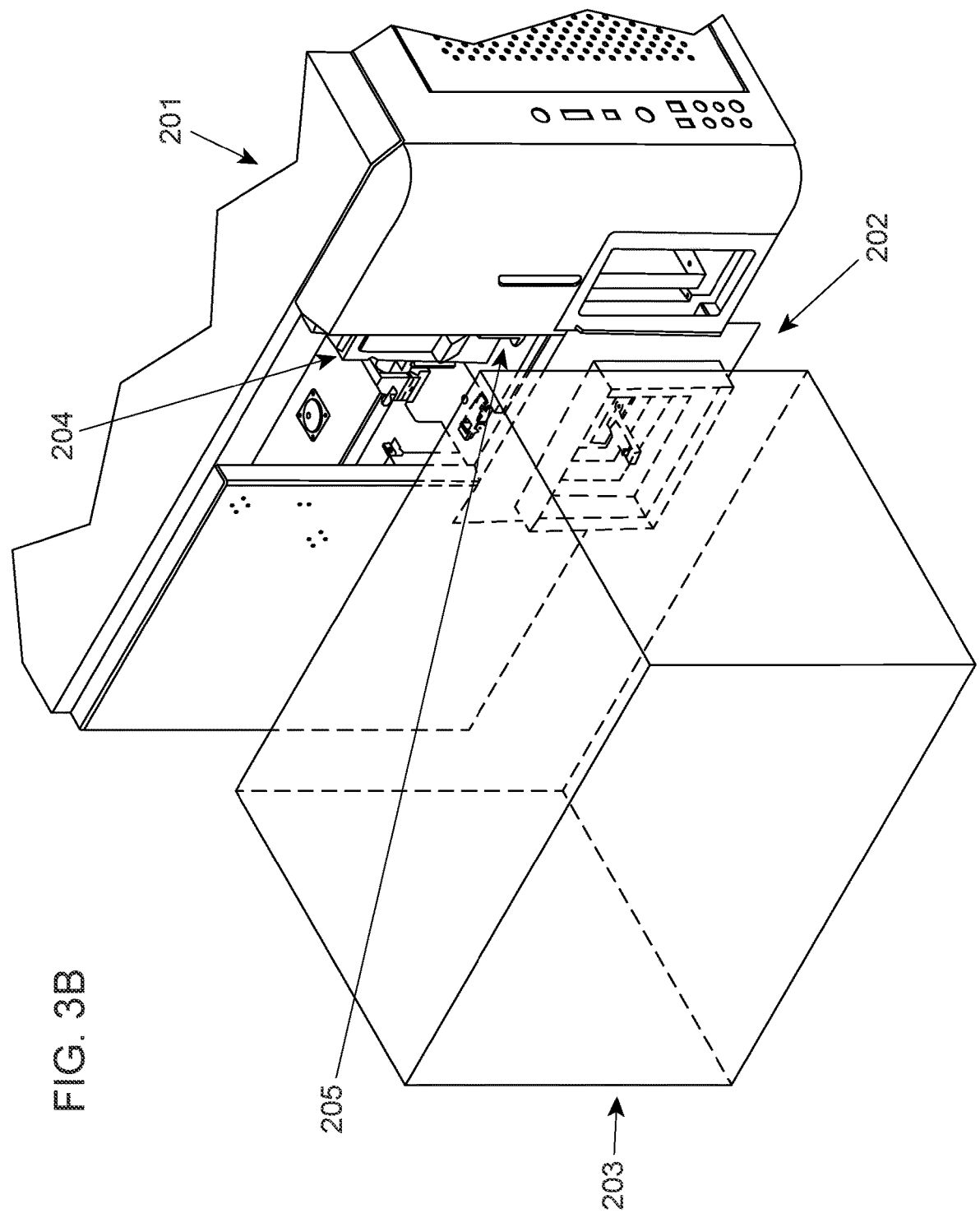

FIG. 3A-B depicts alternate views of a sorting flow cytometer 201 having a closed-system sorting flow cytometer adapter in an unexpanded configuration. Flow cytometer 201 is connected to external chamber 203 via unexpanded connector 202. As shown in FIG. 3B, sorting flow cytometer 201 includes sort block 204 and sort bucket 205. Connector 202 is attached to sort bucket 205.

Figure 4A:
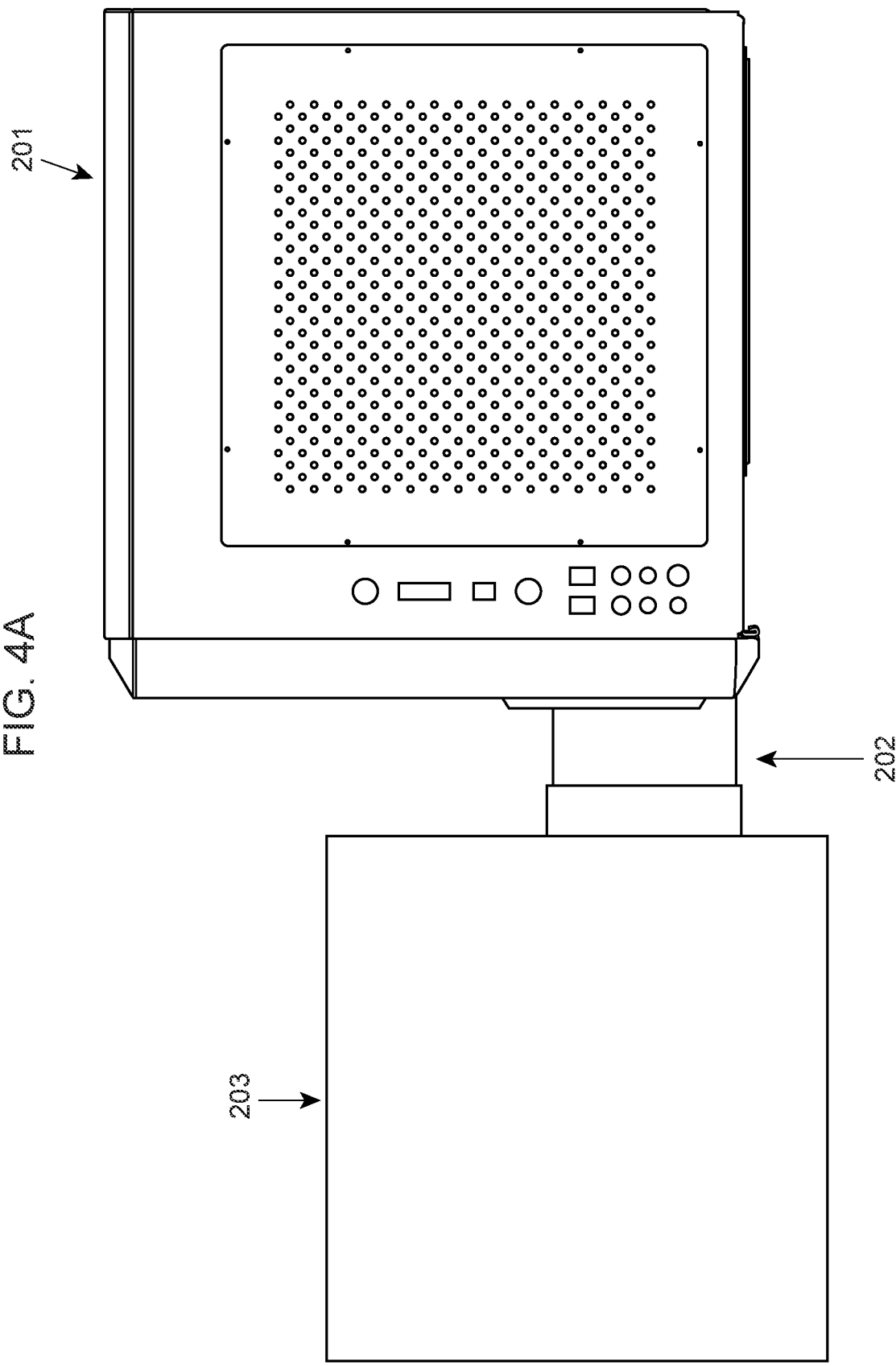
FIG. 4A-B depict alternate views of a sorting flow cytometer having a closed-system flow cytometer adapter in an expanded configuration according to certain embodiments.
Figure 4B:
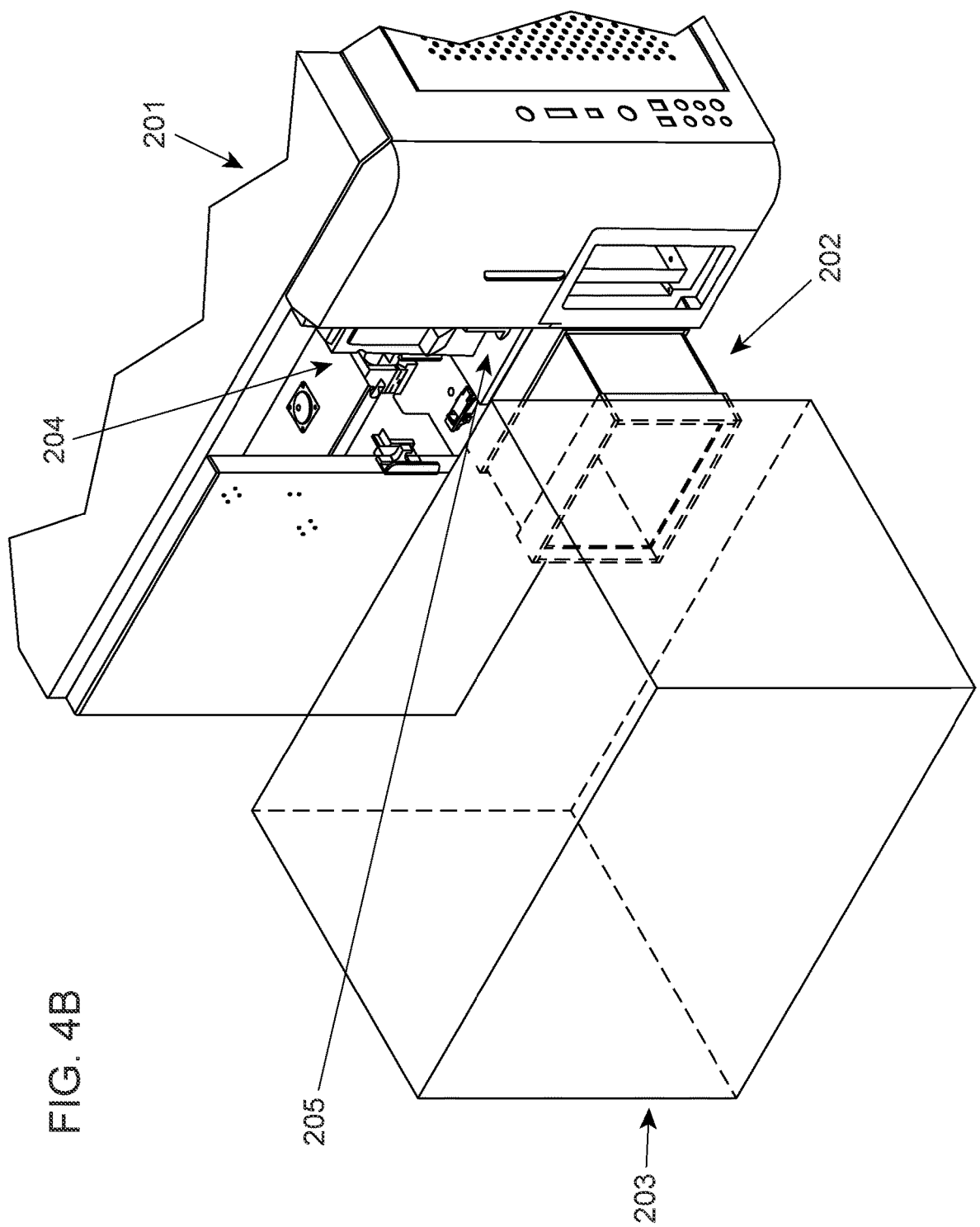

FIG. 4A-B depicts alternate views of sorting flow cytometer 201 of FIG. 3A-B having a closed-system sorting flow cytometer adapter in an expanded configuration. Flow cytometer 201 is connected to external chamber 203 via expanded connector 202. As shown in FIG. 4B, sorting flow cytometer 201 includes sort block 204 and sort bucket 205. Connector 202 is attached to sort bucket 205.

As discussed above, aspects of the invention also include an illumination source configured to irradiate particles passing through the flow cell at an interrogation point. Any convenient illumination source may be employed as the illumination source described herein. In some embodiments, the illumination source is a laser. In embodiments, the laser may be any convenient laser, such as a continuous wave laser. For example, the laser may be a diode laser, such as an ultraviolet diode laser, a visible diode laser and a near-infrared diode laser. In other embodiments, the laser may be a helium-neon (HeNe) laser. In some instances, the laser is a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the subject flow cytometers include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject flow cytometers include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

Laser illumination sources according to certain embodiments may also include one or more optical adjustment components. In certain embodiments, the optical adjustment component is located between the illumination source and the flow cell, and may include any device that is capable of changing the spatial width of irradiation or some other characteristic of irradiation from the illumination source, such as for example, irradiation direction, wavelength, beam width, beam intensity and focal spot. Optical adjustment protocols may include any convenient device which adjusts one or more characteristics of the illumination source, including but not limited to lenses, mirrors, filters, fiber optics, wavelength separators, pinholes, slits, collimating protocols and combinations thereof. In certain embodiments, flow cytometers of interest include one or more focusing lenses. The focusing lens, in one example, may be a de-magnifying lens. In still other embodiments, flow cytometers of interest include fiber optics.

Where the optical adjustment component is configured to move, the optical adjustment component may be configured to be moved continuously or in discrete intervals, such as for example in 0.01 µm or greater increments, such as 0.05 µm or greater, such as 0.1 µm or greater, such as 0.5 µm or greater such as 1 µm or greater, such as 10 µm or greater, such as 100 µm or greater, such as 500 µm or greater, such as 1 mm or greater, such as 5 mm or greater, such as 10 mm or greater and including 25 mm or greater increments.

Any displacement protocol may be employed to move the optical adjustment component structures, such as coupled to a moveable support stage or directly with a motor actuated translation stage, leadscrew translation assembly, geared translation device, such as those employing a stepper motor, servo motor, brushless electric motor, brushed DC motor, micro-step drive motor, high resolution stepper motor, among other types of motors.

The illumination source may be positioned any suitable distance from the flow cell, such as where the illumination source and the flow cell are separated by 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, the illumination source may be positioned at any suitable angle relative to the flow cell, such as at an angle ranging from 10 degrees to 90 degrees, such as from 15 degrees to 85 degrees, such as from 20 degrees to 80 degrees, such as from 25 degrees to 75 degrees and including from 30 degrees to 60 degrees, for example at a 90 degree angle.

In some embodiments, illumination sources of interest include a plurality of lasers configured to provide laser light for discrete irradiation of the flow stream, such as 2 lasers or more, such as 3 lasers or more, such as 4 lasers or more, such as 5 lasers or more, such as 10 lasers or more, and including 15 lasers or more configured to provide laser light for discrete irradiation of the flow stream. Depending on the desired wavelengths of light for irradiating the flow stream, each laser may have a specific wavelength that varies from 200 nm to 1500 nm, such as from 250 nm to 1250 nm, such as from 300 nm to 1000 nm, such as from 350 nm to 900 nm and including from 400 nm to 800 nm. In certain embodiments, lasers of interest may include one or more of a 405 nm laser, a 488 nm laser, a 561 nm laser and a 635 nm laser.

Some aspects of the flow cytometers may include a forward-scatter detector configured to detect forward-scattered light. The number of forward scatter detectors in the subject flow cytometers may vary, as desired. For example, the subject flow cytometers may include 1 forward-scatter detector or multiple forward-scatter detectors, such as 2 or more, such as 3 or more, such as 4 or more, and including 5 or more. In certain embodiments, flow cytometers include 1 forward-scatter detector. In other embodiments, flow cytometers include 2 forward-scatter detectors.

Any convenient detector for detecting collected light may be used in the forward-scatter detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 cm$^2$ to 10 cm$^2$, such as from 0.05 cm$^2$ to 9 cm$^2$, such as from, such as from 0.1 cm$^2$ to 8 cm$^2$, such as from 0.5 cm$^2$ to 7 cm$^2$ and including from 1 cm$^2$ to 5 cm$^2$.

In embodiments, the forward-scatter detector is configured to measure light continuously or in discrete intervals. In some instances, detectors of interest are configured to take measurements of the collected light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Certain embodiments of the invention include a side-scatter detector configured to detect side-scatter wavelengths of light (e.g., light refracted and reflected from the surfaces and internal structures of the particle). In other embodiments, flow cytometers include multiple side-scatter detectors, such as 2 or more, such as 3 or more, such as 4 or more, and including 5 or more.

Any convenient detector for detecting collected light may be used in the side-scatter detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 cm$^2$ to 10 cm$^2$, such as from 0.05 cm$^2$ to 9 cm$^2$, such as from, such as from 0.1 cm$^2$ to 8 cm$^2$, such as from 0.5 cm$^2$ to 7 cm$^2$ and including from 1 cm$^2$ to 5 cm$^2$.

Embodiments of the invention also include a light dispersion/separator module positioned between the light detection module and the side-scatter detector. Light dispersion devices of interest include but are not limited to, colored glass, bandpass filters, interference filters, dichroic mirrors, diffraction gratings, monochromators and combinations thereof, among other wavelength separating devices.

In embodiments, the subject flow cytometers also include a fluorescent light detector configured to detect one or more fluorescent wavelengths of light. In other embodiments, flow cytometers include multiple fluorescent light detectors such as 2 or more, such as 3 or more, such as 4 or more, 5 or more, 10 or more, 15 or more, 20 or more, 25 or more, 50 or more, 75 or more, including 80 or more.

Any convenient detector for detecting collected light may be used in the fluorescent light detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 cm$^2$ to 10 cm$^2$, such as from 0.05 cm$^2$ to 9 cm$^2$, such as from, such as from 0.1 cm$^2$ to 8 cm$^2$, such as from 0.5 cm$^2$ to 7 cm$^2$ and including from 1 cm$^2$ to 5 cm$^2$.

Where the subject flow cytometers include multiple fluorescent light detectors, each fluorescent light detector may be the same, or the collection of fluorescent light detectors may be a combination of different types of detectors. For example, where the subject flow cytometers include two fluorescent light detectors, in some embodiments the first fluorescent light detector is a CCD-type device and the second fluorescent light detector (or imaging sensor) is a CMOS-type device. In other embodiments, both the first and second fluorescent light detectors are CCD-type devices. In yet other embodiments, both the first and second fluorescent light detectors are CMOS-type devices. In still other embodiments, the first fluorescent light detector is a CCD-type device and the second fluorescent light detector is a photomultiplier tube (PMT). In still other embodiments, the first fluorescent light detector is a CMOS-type device and the second fluorescent light detector is a photomultiplier tube. In yet other embodiments, both the first and second fluorescent light detectors are photomultiplier tubes.

In embodiments of the present disclosure, fluorescent light detectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths. In some embodiments, 2 or more detectors in a flow cytometer as described herein are configured to measure the same or overlapping wavelengths of collected light.

In some embodiments, sorting flow cytometers include one or more wavelength separators positioned between the flow cell and the fluorescent light detector(s). The term "wavelength separator" is used herein in its conventional sense to refer to an optical component that is configured to separate light collected from the sample into predetermined spectral ranges. In some embodiments, flow cytometers include a single wavelength separator. In other embodiments, flow cytometers include a plurality of wavelength separators, such as 2 or more wavelength separators, such as 3 or more, such as 4 or more, such as 5 or more, such as 6 or more, such as 7 or more, such as 8 or more, such as 9 or more, such as 10 or more, such as 15 or more, such as 25 or more, such as 50 or more, such as 75 or more and including 100 or more wavelength separators. In some embodiments, the wavelength separator is configured to separate light collected from the sample into predetermined spectral ranges by passing light having a predetermined spectral range and reflecting one or more remaining spectral ranges of light. In other embodiments, the wavelength separator is configured to separate light collected from the sample into predetermined spectral ranges by passing light having a predetermined spectral range and absorbing one or more remaining spectral ranges of light. In yet other embodiments, the wavelength separator is configured to spatially diffract light collected from the sample into predetermined spectral ranges. Each wavelength separator may be any convenient light separation protocol, such as one or more dichroic mirrors, bandpass filters, diffraction gratings, beam splitters or prisms. In some embodiments, the wavelength separator is a prism. In other embodiments, the wavelength separator is a diffraction grating. In certain embodiments, wavelength separators in the subject light detection systems are dichroic mirrors.

In some embodiments, fluorescent light detectors of interest are configured to measure collected light over a range of wavelengths (e.g., 200 nm-1000 nm). In certain embodiments, detectors of interest are configured to collect spectra of light over a range of wavelengths. For example, flow cytometers may include one or more detectors configured to collect spectra of light over one or more of the wavelength ranges of 200 nm-1000 nm. In yet other embodiments, detectors of interest are configured to measure light emitted by a sample in the flow stream at one or more specific wavelengths. For example, flow cytometers may include one or more detectors configured to measure light at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, one or more detectors may be configured to be paired with specific fluorophores, such as those used with the sample in a fluorescence assay.

In some embodiments, the subject flow cytometers are operated in conjunction with programmable logic that may be implemented in hardware, software, firmware, or any combination thereof in order to, e.g., execute sorting decisions based on flow cytometer data received from the detector(s). For example, where programmable logic is implemented in software, sorting decisions may be realized at least in part by a computer-readable data storage medium comprising program code including instructions that, when executed, estimates particle morphology based on collected light from the flow cell and appropriately executes a sorting decision. The computer-readable medium may be a non-transitory storage medium. The subject programmable logic may be implemented in any of a variety of devices such as specifically programmed event processing computers, wireless communication devices, integrated circuit devices, or the like. In some embodiments, the programable logic may be executed by a specifically programmed processor, which may include one or more processors, such as one or more digital signal processors (DSPs), configurable microprocessors, an application specific integrated circuits (ASICs), field programmable gate arrays (FPGAs), or other equivalent integrated or discrete logic circuitry. A combination of computing devices, e.g., a combination of a DSP and a microprocessor, a plurality of microprocessors, one or more microprocessors in conjunction with a DSP core, or any other such configuration in at least partial data connectivity may implement one or more of the features described herein.

As discussed above, aspects of the subject flow cytometers include a flow cell configured to propagate particles in a flow stream. Any convenient flow cell which propagates a fluidic sample to a sample interrogation region may be employed, where in some embodiments, the flow cell includes is a cylindrical flow cell, a frustoconical flow cell or a flow cell that includes a proximal cylindrical portion defining a longitudinal axis and a distal frustoconical portion which terminates in a flat surface having the orifice that is transverse to the longitudinal axis.

In some embodiments, the sample flow stream emanates from an orifice at the distal end of the flow cell. Depending on the desired characteristics of the flow stream, the flow cell orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, flow cell of interest has a circular orifice. The size of the nozzle orifice may vary, in some embodiments ranging from 1 µm to 10000 µm, such as from 25 µm to 7500 µm, such as from 50 µm to 5000 µm, such as from 75 µm to 1000 µm, such as from 100 µm to 750 µm and including from 150 µm to 500 µm. In certain embodiments, the nozzle orifice is 100 µm.

In some embodiments, the flow cell includes a sample injection port configured to provide a sample to the flow cell. The sample injection port may be an orifice positioned in a wall of the inner chamber or may be a conduit positioned at the proximal end of the inner chamber. Where the sample injection port is an orifice positioned in a wall of the inner chamber, the sample injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. In certain embodiments, the sample injection port has a circular orifice. The size of the sample injection port orifice may vary depending on shape, in certain instances, having an opening ranging from 0.1 mm to 5.0 mm, such as 0.2 mm to 3.0 mm, such as 0.5 mm to 2.5 mm, such as from 0.75 mm to 2.25 mm, such as from 1 mm to 2 mm and including from 1.25 mm to 1.75 mm, for example 1.5 mm.

In certain instances, the sample injection port is a conduit positioned at a proximal end of the flow cell inner chamber. For example, the sample injection port may be a conduit positioned to have the orifice of the sample injection port in line with the flow cell orifice. Where the sample injection port is a conduit positioned in line with the flow cell orifice, the cross-sectional shape of the sample injection tube may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm. The shape of the tip of the sample injection port may be the same or different from the cross-sectional shape of the sample injection tube. For example, the orifice of the sample injection port may include a beveled tip having a bevel angle ranging from 1 degree to 10 degrees, such as from 2 degrees to 9 degrees, such as from 3 degrees to 8 degrees, such as from 4 degrees to 7 degrees and including a bevel angle of 5 degrees.

In some embodiments, the flow cell also includes a sheath fluid injection port configured to provide a sheath fluid to the flow cell. In embodiments, the sheath fluid injection system is configured to provide a flow of sheath fluid to the flow cell inner chamber, for example in conjunction with the sample to produce a laminated flow stream of sheath fluid surrounding the sample flow stream. Depending on the desired characteristics of the flow stream, the rate of sheath fluid conveyed to the flow cell chamber by the may be 25 µL/sec to 2500 µL/sec, such as 50 µL/sec to 1000 µL/sec, and including 75 µL/sec or more to 750 µL/sec.

In some embodiments, the sheath fluid injection port is an orifice positioned in a wall of the inner chamber. The sheath fluid injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In some embodiments, systems further include a pump in fluid communication with the flow cell to propagate the flow stream through the flow cell. Any convenient fluid pump protocol may be employed to control the flow of the flow stream through the flow cell. In certain instances, systems include a peristaltic pump, such as a peristaltic pump having a pulse damper. The pump in the subject systems is configured to convey fluid through the flow cell at a rate suitable for multi-photon counting of light from the sample in the flow stream. For example, the system may include a pump that is configured to flow sample through the flow cell at a rate that ranges from 1 nL/min to 500 nL/min, such as from 1 nL/min to 250 nL/min, such as from 1 nL/min to 100 nL/min, such as from 2 nL/min to 90 nL/min, such as from 3 nL/min to 80 nL/min, such as from 4 nL/min to 70 nL/min, such as from 5 nL/min to 60 nL/min and including from 10 nL/min to 50 nL/min. In certain embodiments, the flow rate of the flow stream is from 5 nL/min to 6 nL/min.

Suitable flow cytometry systems may include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem*. January; 49 (pt 1):17-28; Linden, et. al., *Semin Throm Hemost*. 2004 October; 30(5): 502-11; Alison, et al. *J Pathol*, 2010 December; 222(4):335-344; and Herbig, et al. (2007) *Crit Rev Ther Drug Carrier Syst*. 24(3):203-255; the disclosures of which are incorporated herein by reference. In certain instances, flow cytometry systems of interest include BD Biosciences FACSCanto™ flow cytometer, BD Biosciences FACSCanto™ II flow cytometer, BD Accuri™ flow cytometer, BD Accuri™ C6 Plus flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer, BD Biosciences LSRFortessa™ flow cytometer, BD Biosciences LSRFortessa™ X-20 flow cytometer, BD Biosciences FACSPresto™ flow cytometer, BD Biosciences FACSVia™ flow cytometer and BD Biosciences FACSCalibur™ cell sorter, a BD Biosciences FACSCount™ cell sorter, BD Biosciences FACSLyric™ cell sorter, BD Biosciences Via™ cell sorter, BD Biosciences Influx™ cell sorter, BD Biosciences Jazz™ cell sorter, BD Biosciences Aria™ cell sorter, BD Biosciences FACSAria™ II cell sorter, BD Biosciences FACSAria™ III cell sorter, BD Biosciences FACSAria™ Fusion cell sorter and BD Biosciences FACSMelody™ cell sorter, BD Biosciences FACSymphony™ S6 cell sorter or the like.

In some embodiments, the subject systems are flow cytometric systems, such those described in U.S. Pat. Nos. 10,663,476; 10,620,111; 10,613,017; 10,605,713; 10,585,031; 10,578,542; 10,578,469; 10,481,074; 10,302,545; 10,145,793; 10,113,967; 10,006,852; 9,952,076; 9,933,341; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; 4,987,086; 4,498,766; the disclosures of which are herein incorporated by reference in their entirety.

In certain instances, flow cytometry systems of the invention are configured for imaging particles in a flow stream by fluorescence imaging using radiofrequency tagged emission (FIRE), such as those described in Diebold, et al. Nature Photonics Vol. 7(10); 806-810 (2013) as well as described in U.S. Pat. Nos. 9,423,353; 9,784,661; 9,983,132; 10,006,852; 10,078,045; 10,036,699; 10,222,316; 10,288,546; 10,324,019; 10,408,758; 10,451,538; 10,620,111; and U.S. Patent Publication Nos. 2017/0133857; 2017/0328826; 2017/0350803; 2018/0275042; 2019/0376895 and 2019/0376894 the disclosures of which are herein incorporated by reference.

Figure 5:
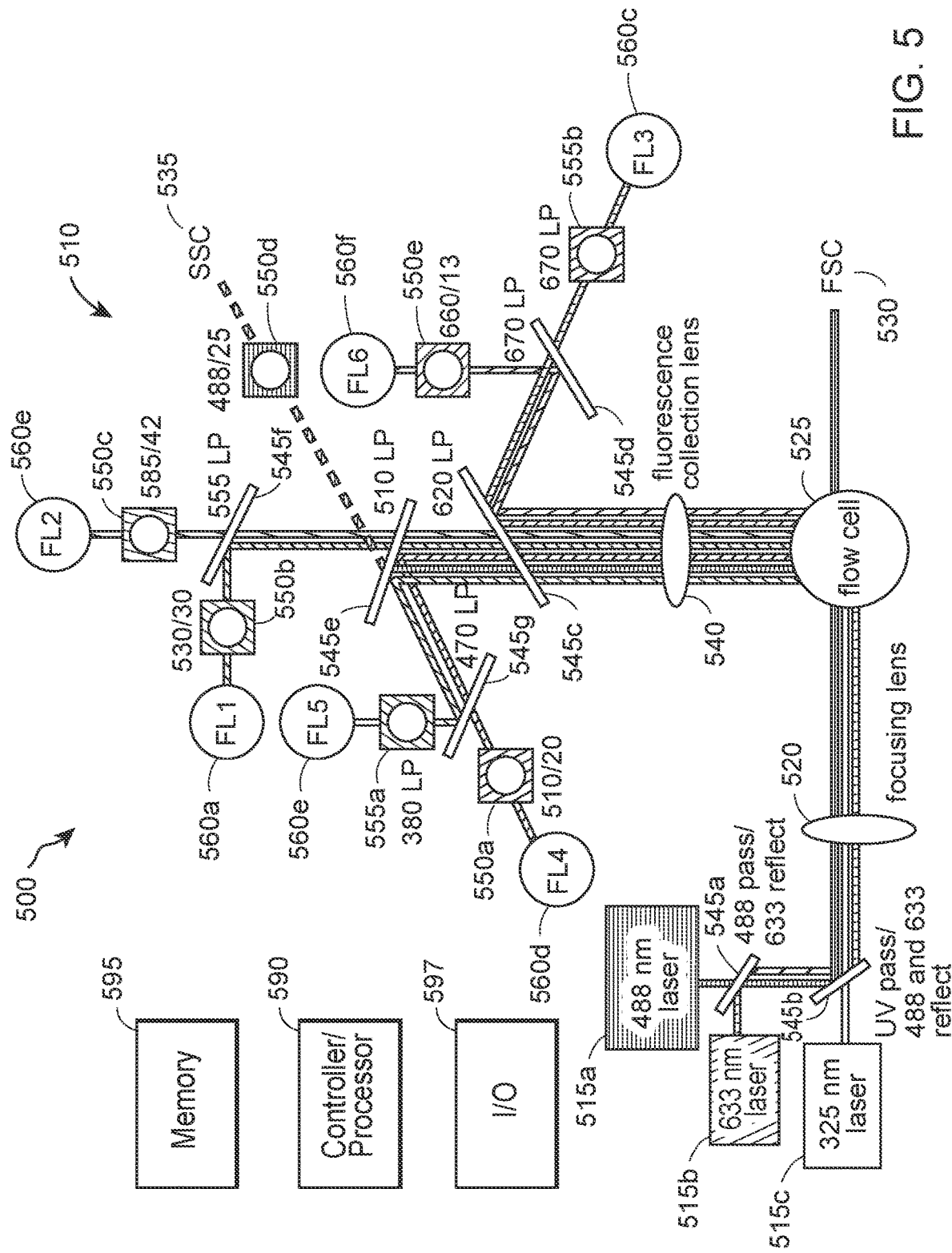
FIG. 5 depicts a functional block diagram of a flow cytometric system according to certain embodiments.

FIG. 5 shows a system 500 for flow cytometry in accordance with an illustrative embodiment of the present invention. The system 500 includes a flow cytometer 510, a controller/processor 590 and a memory 595. The flow cytometer 510 includes one or more excitation lasers 515a-515c, a focusing lens 520, a flow chamber 525, a forward-scatter detector 530, a side-scatter detector 535, a fluorescence collection lens 540, one or more beam splitters 545a-545g, one or more bandpass filters 550a-550e, one or more longpass ("LP") filters 555a-555b, and one or more fluorescent detectors 560a-560f.

The excitation lasers 515a-c emit light in the form of a laser beam. The wavelengths of the laser beams emitted from excitation lasers 515a-515c are 488 nm, 633 nm, and 325 nm, respectively, in the example system of FIG. 5. The laser beams are first directed through one or more of beam splitters 545a and 545b. Beam splitter 545a transmits light at 488 nm and reflects light at 633 nm. Beam splitter 545b transmits UV light (light with a wavelength in the range of 10 to 400 nm) and reflects light at 488 nm and 633 nm.

The laser beams are then directed to a focusing lens 520, which focuses the beams onto the portion of a fluid stream where particles of a sample are located, within the flow chamber 525. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward-scatter detector 530, the side-scatter detector 535, and the one or more fluorescent detectors 560a-560f through one or more of the beam splitters 545c-545g, the bandpass filters 550a-550e, the longpass filters 555a-555b, and the fluorescence collection lens 540.

The fluorescence collection lens 540 collects light emitted from the particle-laser beam interaction and routes that light towards one or more beam splitters and filters. Bandpass filters, such as bandpass filters 550a-550e, allow a narrow range of wavelengths to pass through the filter. For example, bandpass filter 550a is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 555a-555b, transmit wavelengths of light equal to or longer than a specified wavelength of light. For example, longpass filter 555b, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

The forward-scatter detector 530 is positioned slightly off axis from the direct beam through the flow cell and is configured to detect diffracted light, the excitation light that travels through or around the particle in mostly a forward direction. The intensity of the light detected by the forward-scatter detector is dependent on the overall size of the particle. The forward-scatter detector can include a photodiode. The side-scatter detector 535 is configured to detect refracted and reflected light from the surfaces and internal structures of the particle that tends to increase with increasing particle complexity of structure. The fluorescence emissions from fluorescent molecules associated with the particle can be detected by the one or more fluorescent detectors 560a-560f. The side-scatter detector 535 and fluorescent detectors can include photomultiplier tubes. The signals detected at the forward-scatter detector 530, the side-scatter detector 535 and the fluorescent detectors can be converted to electronic signals (voltages) by the detectors. This data can provide information about the sample.

One of skill in the art will recognize that a flow cytometer in accordance with an embodiment of the present invention is not limited to the flow cytometer depicted in FIG. 5, but can include any flow cytometer known in the art. For example, a flow cytometer may have any number of lasers, beam splitters, filters, and detectors at various wavelengths and in various different configurations.

In operation, cytometer operation is controlled by a controller/processor 590, and the measurement data from the detectors can be stored in the memory 595 and processed by the controller/processor 590. Although not shown explicitly, the controller/processor 590 is coupled to the detectors to receive the output signals therefrom, and may also be coupled to electrical and electromechanical components of the flow cytometer 510 to control the lasers, fluid flow parameters, and the like. Input/output (I/O) capabilities 597 may be provided also in the system. The memory 595, controller/processor 590, and I/O 597 may be entirely provided as an integral part of the flow cytometer 510. In such an embodiment, a display may also form part of the I/O capabilities 597 for presenting experimental data to users of the cytometer 510. Alternatively, some or all of the memory 595 and controller/processor 590 and I/O capabilities may be part of one or more external devices such as a general purpose computer. In some embodiments, some or all of the memory 595 and controller/processor 590 can be in wireless or wired communication with the cytometer 510. The controller/processor 590 in conjunction with the memory 595 and the I/O 597 can be configured to perform various functions related to the preparation and analysis of a flow cytometer experiment.

The system illustrated in FIG. 5 includes six different detectors that detect fluorescent light in six different wavelength bands (which may be referred to herein as a "filter window" for a given detector) as defined by the configuration of filters and/or splitters in the beam path from the flow cell 525 to each detector. Different fluorescent molecules used for a flow cytometer experiment will emit light in their own characteristic wavelength bands. The particular fluorescent labels used for an experiment and their associated fluorescent emission bands may be selected to generally coincide with the filter windows of the detectors. The I/O 597 can be configured to receive data regarding a flow cytometer experiment having a panel of fluorescent labels and a plurality of cell populations having a plurality of markers, each cell population having a subset of the plurality of markers. The I/O 597 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 595. The controller/processor 590 can be configured to evaluate one or more assignments of labels to markers.

In some embodiments, the subject systems are particle sorting systems that are configured to sort particles with an enclosed particle sorting module, such as those described in U.S. Patent Publication No. 2017/0299493, filed on Mar. 28, 2017, the disclosure of which is incorporated herein by reference. In certain embodiments, particles (e.g., cells) of the sample are sorted using a sort decision module having a plurality of sort decision units, such as those described in U.S. Patent Publication No. 2020/0256781, filed on Dec. 23, 2019, the disclosure of which is incorporated herein by reference. In some embodiments, systems for sorting components of a sample include a particle sorting module having deflection plates, such as described in U.S. Patent Publication No. 2017/0299493, filed on Mar. 28, 2017, the disclosure of which is incorporated herein by reference.

Figure 6:
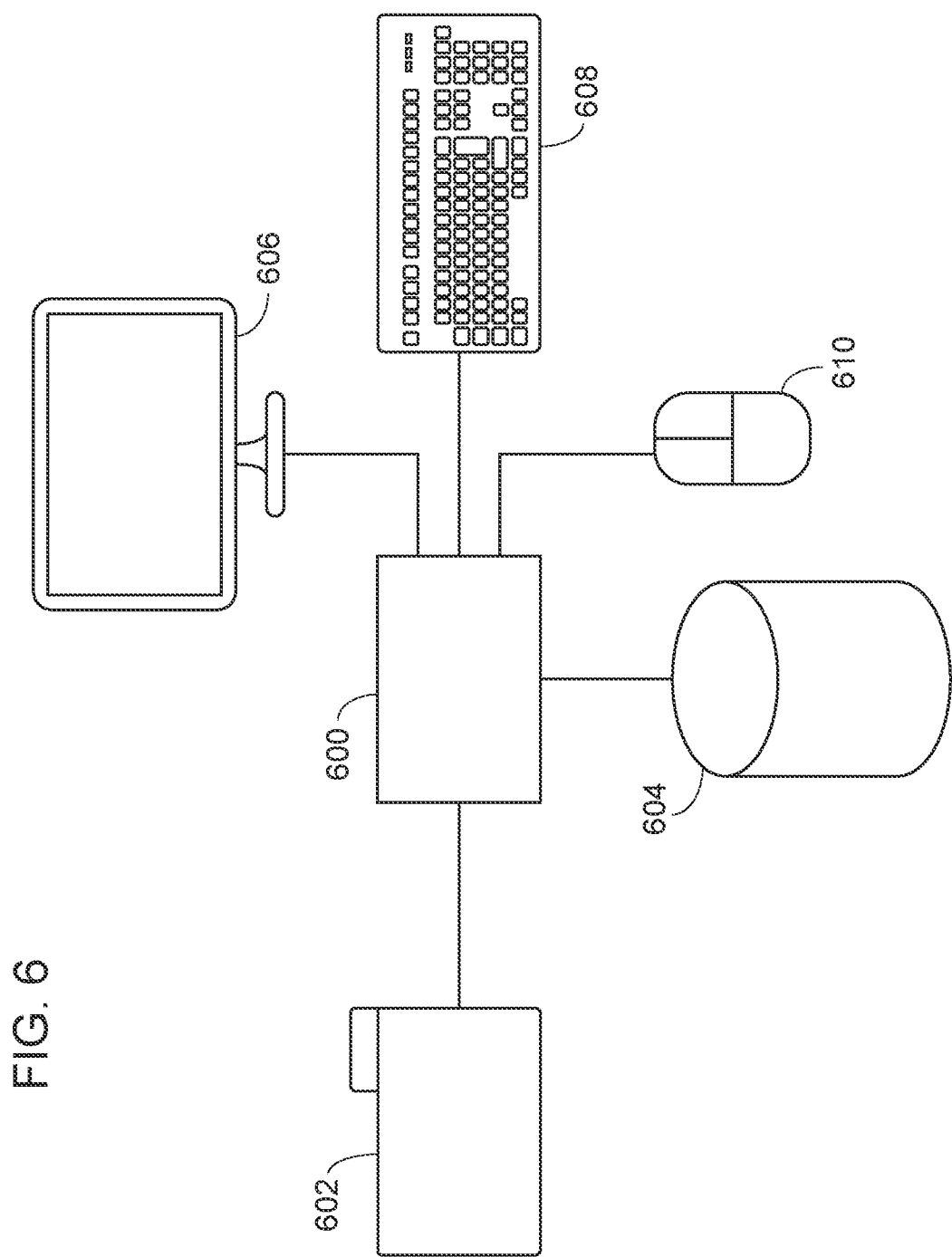
FIG. 6 depicts a sorting control system according to certain embodiments.

FIG. 6 shows a functional block diagram for one example of a sorting control system, such as a processor 600, for analyzing and displaying biological events. A processor 600 can be configured to implement a variety of processes for controlling graphic display of biological events.

A flow cytometer or sorting system 602 can be configured to acquire biological event data. For example, a flow cytometer can generate flow cytometric event data. The flow cytometer 602 can be configured to provide biological event data to the processor 600. A data communication channel can be included between the flow cytometer 602 and the processor 600. The biological event data can be provided to the processor 600 via the data communication channel.

The processor 600 can be configured to receive biological event data from the flow cytometer 602. The biological event data received from the flow cytometer 602 can include flow cytometric event data. The processor 600 can be configured to provide a graphical display including a first plot of biological event data to a display device 606. The processor 600 can be further configured to render a region of interest as a gate around a population of biological event data shown by the display device 606, overlaid upon the first plot, for example. In some embodiments, the gate can be a logical combination of one or more graphical regions of interest drawn upon a single parameter histogram or bivariate plot. In some embodiments, the display can be used to display particle parameters or saturated detector data.

The processor 600 can be further configured to display the biological event data on the display device 606 within the gate differently from other events in the biological event data outside of the gate. For example, the processor 600 can be configured to render the color of biological event data contained within the gate to be distinct from the color of biological event data outside of the gate. The display device 606 can be implemented as a monitor, a tablet computer, a smartphone, or other electronic device configured to present graphical interfaces.

The processor 600 can be configured to receive a gate selection signal identifying the gate from a first input device. For example, the first input device can be implemented as a mouse 610. The mouse 610 can initiate a gate selection signal to the processor 600 identifying the gate to be displayed on or manipulated via the display device 606 (e.g., by clicking on or in the desired gate when the cursor is positioned there). In some implementations, the first device can be implemented as the keyboard 608 or other means for providing an input signal to the processor 600 such as a touchscreen, a stylus, an optical detector, or a voice recognition system. Some input devices can include multiple inputting functions. In such implementations, the inputting functions can each be considered an input device. For example, as shown in FIG. 6, the mouse 610 can include a right mouse button and a left mouse button, each of which can generate a triggering event.

The triggering event can cause the processor 600 to alter the manner in which the data is displayed, which portions of the data is actually displayed on the display device 606, and/or provide input to further processing such as selection of a population of interest for particle sorting.

In some embodiments, the processor 600 can be configured to detect when gate selection is initiated by the mouse 610. The processor 600 can be further configured to automatically modify plot visualization to facilitate the gating process. The modification can be based on the specific distribution of biological event data received by the processor 600.

The processor 600 can be connected to a storage device 604. The storage device 604 can be configured to receive and store biological event data from the processor 600. The storage device 604 can also be configured to receive and store flow cytometric event data from the processor 600. The storage device 604 can be further configured to allow retrieval of biological event data, such as flow cytometric event data, by the processor 600.

The display device 606 can be configured to receive display data from the processor 600. The display data can comprise plots of biological event data and gates outlining sections of the plots. The display device 606 can be further configured to alter the information presented according to input received from the processor 600 in conjunction with input from the flow cytometer 602, the storage device 604, the keyboard 608, and/or the mouse 610.

In some implementations the processor 600 can generate a user interface to receive example events for sorting. For example, the user interface can include a mechanism for receiving example events or example images. The example events or images or an example gate can be provided prior to collection of event data for a sample or based on an initial set of events for a portion of the sample.

Figure 7A:
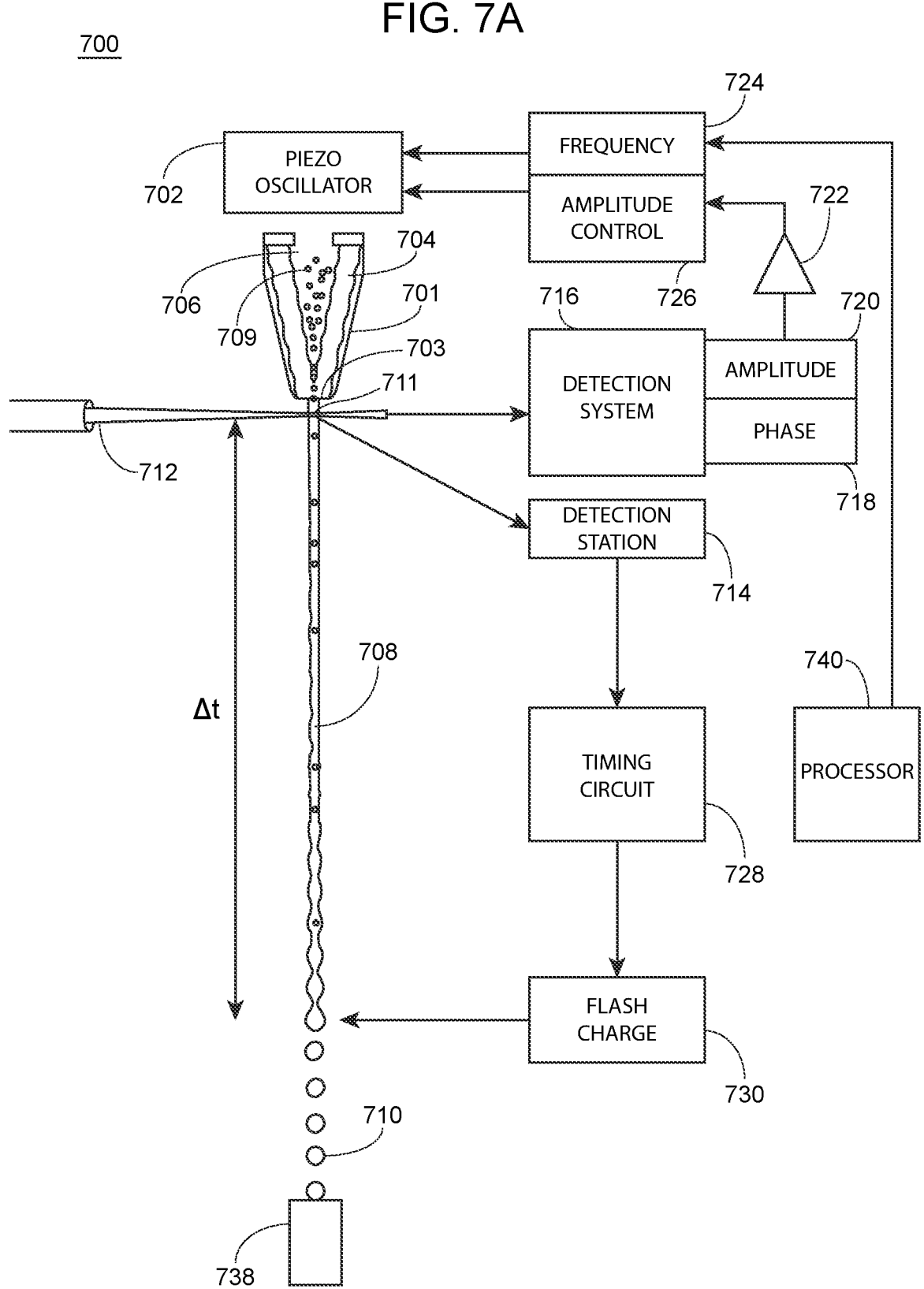
FIG. 7A-B depict a schematic drawing of a particle sorter system according to certain embodiments.

FIG. 7A is a schematic drawing of a particle sorter system 700 (e.g., the flow cytometer 602) in accordance with one embodiment presented herein. In some embodiments, the particle sorter system 700 is a cell sorter system. As shown in FIG. 7A, a drop formation transducer 702 (e.g., piezo-oscillator) is coupled to a fluid conduit 701, which can be coupled to, can include, or can be, a nozzle 703. Within the fluid conduit 701, sheath fluid 704 hydrodynamically focuses a sample fluid 706 comprising particles 709 into a moving fluid column 708 (e.g. a stream). Within the moving fluid column 708, particles 709 (e.g., cells) are lined up in single file to cross a monitored area 711 (e.g., where laser-stream intersect), irradiated by an irradiation source 712 (e.g., a laser). Vibration of the drop formation transducer 702 causes moving fluid column 708 to break into a plurality of drops 710, some of which contain particles 709.

In operation, a detection station 714 (e.g., an event detector) identifies when a particle of interest (or cell of interest) crosses the monitored area 711. Detection station 714 feeds into a timing circuit 728, which in turn feeds into a flash charge circuit 730. At a drop break off point, informed by a timed drop delay (at), a flash charge can be applied to the moving fluid column 708 such that a drop of interest carries a charge. The drop of interest can include one or more particles or cells to be sorted. The charged drop can then be sorted by activating deflection plates (not shown) to deflect the drop into a vessel such as a collection tube or a multi-well or microwell sample plate where a well or microwell can be associated with drops of particular interest. As shown in FIG. 7A, the drops can be collected in a drain receptacle 738.

A detection system 716 (e.g. a drop boundary detector) serves to automatically determine the phase of a drop drive signal when a particle of interest passes the monitored area 711. An exemplary drop boundary detector is described in U.S. Pat. No. 7,679,039, which is incorporated herein by reference in its entirety. The detection system 716 allows the instrument to accurately calculate the place of each detected particle in a drop. The detection system 716 can feed into an amplitude signal 720 and/or phase 718 signal, which in turn feeds (via amplifier 722) into an amplitude control circuit 726 and/or frequency control circuit 724. The amplitude control circuit 726 and/or frequency control circuit 724, in turn, controls the drop formation transducer 702. The amplitude control circuit 726 and/or frequency control circuit 724 can be included in a control system.

In some implementations, sort electronics (e.g., the detection system 716, the detection station 714 and a processor 740) can be coupled with a memory configured to store the detected events and a sort decision based thereon. The sort decision can be included in the event data for a particle. In some implementations, the detection system 716 and the detection station 714 can be implemented as a single detection unit or communicatively coupled such that an event measurement can be collected by one of the detection system 716 or the detection station 714 and provided to the non-collecting element.

Figure 7B:
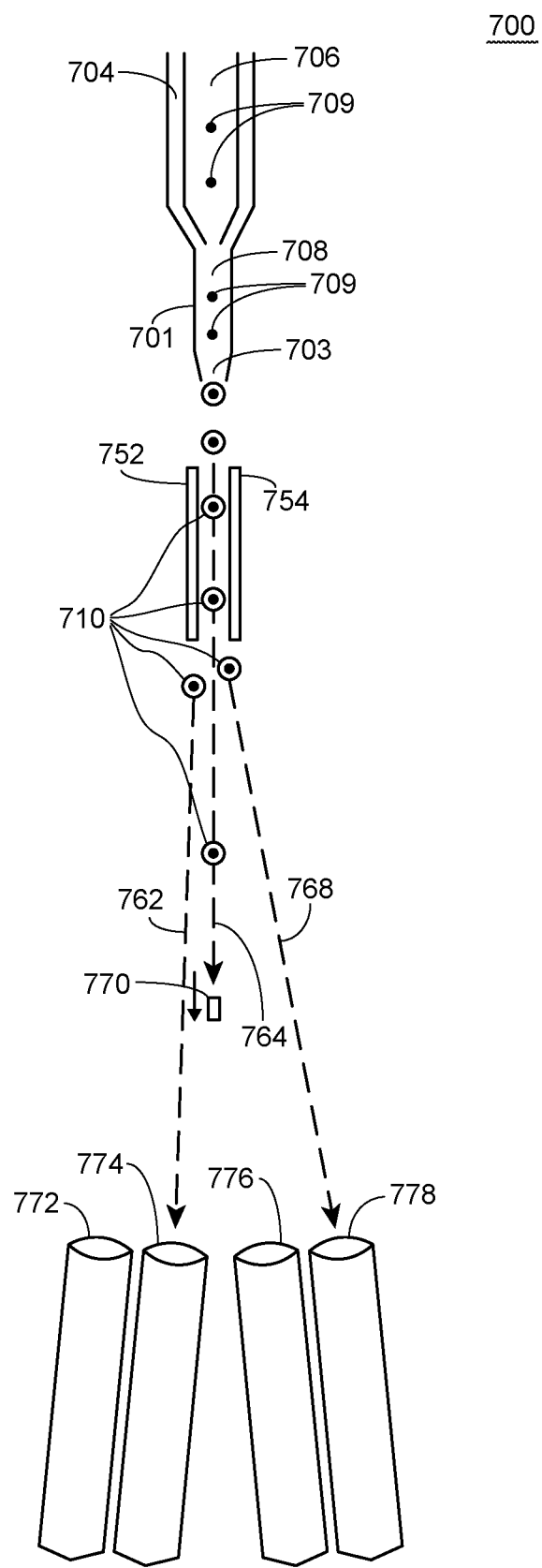

FIG. 7B is a schematic drawing of a sort block, in accordance with one embodiment presented herein. The particle sorter system 700 shown in FIG. 7B, includes deflection plates 752 and 754. A charge can be applied via a stream-charging wire in a barb. This creates a stream of droplets 710 containing particles 709 for analysis. The particles can be illuminated with one or more light sources (e.g., lasers) to generate light scatter and fluorescence information. The information for a particle is analyzed such as by sorting electronics or other detection system (not shown in FIG. 7B). The deflection plates 752 and 754 can be independently controlled to attract or repel the charged droplet to guide the droplet toward a destination collection vessel (e.g., one of 772, 774, 776, or 778). As shown in FIG. 7B, the deflection plates 752 and 754 can be controlled to direct a particle along a first path 762 toward the vessel 774 or along a second path 768 toward the vessel 778. If the particle is not of interest (e.g., does not exhibit scatter or illumination information within a specified sort range), deflection plates may allow the particle to continue along a flow path 764. Such uncharged droplets may pass into a waste receptacle such as via aspirator 770.

The sorting electronics can be included to initiate collection of measurements, receive fluorescence signals for particles, and determine how to adjust the deflection plates to cause sorting of the particles. Example implementations of the embodiment shown in FIG. 7B include the BD FACSAria™ line of flow cytometers commercially provided by Becton, Dickinson and Company (Franklin Lakes, NJ).

Methods of Analyzing a Sample

As discussed above, aspects of the invention also include methods for analyzing a sample. Methods of interest include introducing a sample into a flow cytometer that includes an illumination source for illuminating a flow cell at an interrogation point, a detector for receiving light from the interrogation point, a sort block in liquid-receiving relationship with the flow cell, and a closed-system sorting flow cytometer adapter in droplet-receiving relationship with the sort block. Adapters of interest include a sort block coupler operably connected to the sort block, an external chamber, and a connector gaseously coupling the sort block to the external chamber, optionally via a sort bucket that is in cellular-receiving relationship with the sort block coupler. Where the adapters include a sort bucket, said sort bucket may be configured to house a plurality of collection vessels for collecting droplets received from the sort block. Where the adapters do not include a sort bucket, embodiments of the adapters may include a sort block coupler that is configured to house a plurality of collection vessels for collecting droplets received from the sort block.

In some instances, the sample analyzed in the instant methods is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

Cells of interest may be targeted for separation from the flow stream according to a variety of parameters, such as a phenotypic characteristic identified via the attachment of a particular fluorescent label to cells of interest. In some embodiments, the system is configured to deflect analyzed droplets that are determined to include a target cell. A variety of cells may be targeted for sorting using the subject methods. Target cells of interest include, but are not limited to, stem cells, T cells, dendritic cells, B Cells, granulocytes, leukemia cells, lymphoma cells, virus cells (e.g., HIV cells), NK cells, macrophages, monocytes, fibroblasts, epithelial cells, endothelial cells, and erythroid cells. Target cells of interest include cells that have a convenient cell surface marker or antigen that may be captured or labelled by a convenient affinity agent or conjugate thereof. For example, the target cell may include a cell surface antigen such as CD11b, CD123, CD14, CD15, CD16, CD19, CD193, CD2, CD25, CD27, CD3, CD335, CD36, CD4, CD43, CD45RO, CD56, CD61, CD7, CD8, CD34, CD1c, CD23, CD304, CD235a, T cell receptor alpha/beta, T cell receptor gamma/delta, CD253, CD95, CD20, CD105, CD117, CD120b, Notch4, Lgr5 (N-Terminal), SSEA-3, TRA-1-60 Antigen, Disialoganglioside GD2 and CD71. In some embodiments, the target cell is selected from HIV containing cell, a Treg cell, an antigen-specific T-cell populations, tumor cells or hematopoietic progenitor cells (CD34+) from whole blood, bone marrow or cord blood.

In practicing the subject methods, an amount of an initial fluidic sample is injected into the flow cytometer. The amount of sample injected into the particle sorting module may vary, for example, ranging from 0.001 mL to 1000 mL, such as from 0.005 mL to 900 mL, such as from 0.01 mL to 800 mL, such as from 0.05 mL to 700 mL, such as from 0.1 mL to 600 mL, such as from 0.5 mL to 500 mL, such as from 1 mL to 400 mL, such as from 2 mL to 300 mL and including from 5 mL to 100 mL of sample.

Methods according to embodiments of the present disclosure include counting and sorting labeled particles (e.g., target cells) in a sample. In practicing the subject methods, the fluidic sample including the particles is first introduced into a flow nozzle of the system. Upon exit from the flow nozzle, the particles are passed substantially one at a time through the sample interrogation region where each of the particles is irradiated to a source of light and measurements of light scatter parameters and, in some instances, fluorescent emissions as desired (e.g., two or more light scatter parameters and measurements of one or more fluorescent emissions) are separately recorded for each particle. Depending on the properties of the flow stream being interrogated, 0.001 mm or more of the flow stream may be irradiated with light, such as 0.005 mm or more, such as 0.01 mm or more, such as 0.05 mm or more, such as 0.1 mm or more, such as 0.5 mm or more and including 1 mm or more of the flow stream may be irradiated with light. In certain embodiments, methods include irradiating a planar cross-section of the flow stream in the sample interrogation region, such as with a laser (as described above). In other embodiments, methods include irradiating a predetermined length of the flow stream in the sample interrogation region, such as corresponding to the irradiation profile of a diffuse laser beam or lamp.

In certain embodiments, methods including irradiating the flow stream at or near the flow cell nozzle orifice. For example, methods may include irradiating the flow stream at a position about 0.001 mm or more from the nozzle orifice, such as 0.005 mm or more, such as 0.01 mm or more, such as 0.05 mm or more, such as 0.1 mm or more, such as 0.5 mm or more and including 1 mm or more from the nozzle orifice. In certain embodiments, methods include irradiating the flow stream immediately adjacent to the flow cell nozzle orifice.

In embodiments of the method, detectors, such as photomultiplier tubes (PMT), are used to record light that passes through each particle (in certain cases referred to as forward light scatter), light that is reflected orthogonal to the direction of the flow of the particles through the sensing region (in some cases referred to as orthogonal or side light scatter) and fluorescent light emitted from the particles, if it is labeled with fluorescent marker(s), as the particle passes through the sensing region and is illuminated by the energy source. Each of forward light scatter (FSC), side-scatter (SSC), and fluorescence emissions include a separate parameter for each particle (or each "event"). Thus, for example, two, three or four parameters can be collected (and recorded) from a particle labeled with two different fluorescence markers.

In some embodiments, methods include detaching the adapter from the sorting flow cytometer. In some instances, methods further include reattaching a second adapter to the particle sorting system after the first particle sorting module has been removed. The first adapter may be washed and sterilized for subsequent use (e.g., with an autoclave) or may be discarded.

The data recorded for each particle is analyzed in real time or stored in a data storage and analysis means, such as a computer, as desired. U.S. Pat. No. 4,284,412 describes the configuration and use of a flow cytometer of interest equipped with a single light source while U.S. Pat. No. 4,727,020 describes the configuration and use of a flow cytometer equipped with two light sources.

In certain embodiments, the particles are detected and uniquely identified by exposing the particles to excitation light and measuring the fluorescence of each particle in one or more detection channels, as desired. Fluorescence emitted in detection channels used to identify the particles and binding complexes associated therewith may be measured following excitation with a single light source, or may be measured separately following excitation with distinct light sources. If separate excitation light sources are used to excite the particle labels, the labels may be selected such that all the labels are excitable by each of the excitation light sources used.

Methods in certain embodiments also include data acquisition, analysis and recording, such as with a computer, wherein multiple data channels record data from each detector for the light scatter and fluorescence emitted by each particle as it passes through the sample interrogation region of the particle sorting module. In these embodiments, analysis includes classifying and counting particles such that each particle is present as a set of digitized parameter values. The subject systems may be set to trigger on a selected parameter in order to distinguish the particles of interest from background and noise. "Trigger" refers to a preset threshold for detection of a parameter and may be used as a means for detecting passage of a particle through the light source. Detection of an event that exceeds the threshold for the selected parameter triggers acquisition of light scatter and fluorescence data for the particle. Data is not acquired for particles or other components in the medium being assayed which cause a response below the threshold. The trigger parameter may be the detection of forward-scattered light caused by passage of a particle through the light beam. The flow cytometer then detects and collects the light scatter and fluorescence data for the particle.

A particular subpopulation of interest is then further analyzed by "gating" based on the data collected for the entire population. To select an appropriate gate, the data is plotted so as to obtain the best separation of subpopulations possible. This procedure may be performed by plotting forward light scatter (FSC) vs. side (i.e., orthogonal) light scatter (SSC) on a two dimensional dot plot. A subpopulation of particles is then selected (i.e., those cells within the gate) and particles that are not within the gate are excluded. Where desired, the gate may be selected by drawing a line around the desired subpopulation using a cursor on a computer screen. Only those particles within the gate are then further analyzed by plotting the other parameters for these particles, such as fluorescence. Where desired, the above analysis may be configured to yield counts of the particles of interest in the sample.

Methods of interest may further include employing sorted particles in research, laboratory testing, or therapy. In some embodiments, the subject methods include obtaining individual cells prepared from a target fluidic or tissue biological sample. For example, the subject methods include obtaining cells from fluidic or tissue samples to be used as a research or diagnostic specimen for diseases such as cancer. Likewise, the subject methods include obtaining cells from fluidic or tissue samples to be used in therapy. A cell therapy protocol is a protocol in which viable cellular material including, e.g., cells and tissues, may be prepared and introduced into a subject as a therapeutic treatment. Conditions that may be treated by the administration of the flow cytometrically sorted sample include, but are not limited to, blood disorders, immune system disorders, organ damage, etc.

A typical cell therapy protocol may include the following steps: sample collection, cell isolation, genetic modification, culture, and expansion in vitro, cell harvesting, sample volume reduction and washing, bio-preservation, storage, and introduction of cells into a subject. The protocol may begin with the collection of viable cells and tissues from source tissues of a subject to produce a sample of cells and/or tissues. The sample may be collected via any suitable procedure that includes, e.g., administering a cell mobilizing agent to a subject, drawing blood from a subject, removing bone marrow from a subject, etc. After collecting the sample, cell enrichment may occur via several methods including, e.g., centrifugation based methods, filter based methods, elutriation, magnetic separation methods, fluorescence-activated cell sorting (FACS), and the like. In some cases, the enriched cells may be genetically modified by any convenient method, e.g., nuclease mediated gene editing. The genetically modified cells can be cultured, activated, and expanded in vitro. In some cases, the cells are preserved, e.g., cryopreserved, and stored for future use where the cells are thawed and then administered to a patient, e.g., the cells may be infused in the patient.

Methods of Assembling a Closed-System Flow Cytometer

Aspects of the disclose further include methods for converting a sorting flow cytometer into a closed-system flow cytometer. Flow cytometers that are suitable for conversion via the instant methods include those possessing a sort block (e.g., such as those described above). Methods of interest include operably connecting a closed-system flow cytometer adapter to the sorting flow cytometer. Adapters for use in the instant methods are described in detail above and include a sort block coupler for operably connecting to the sort block. In embodiments, methods including sliding the sort block coupler onto a distal portion of the sort block. In further embodiments, attaching the sort block coupler includes fastening the sort block coupler to the sort block via a sealing gasket.

In some cases, methods include operably attaching a sort bucket to the sort block coupler such that the sort bucket is in cellular-receiving relationship with the sort block coupler. In such cases, methods may involve attaching the sort bucket to the sort block coupler via a plurality of latches. In addition, embodiments of the method include attaching the sort bucket to the sort block coupler via a sealing gasket.

Methods of the present disclosure may further include gaseously connecting an external chamber to the sort block via a connector and thereby generating a closed system. Connectors of interest may include a flexible portion and a set of collars. In some cases, the collars are rigid. Embodiments of the method include attaching the connector by fastening the collar to the sort bucket. Embodiments of the method further include attaching the connector by fastening the collar to the external chamber. The collar (and the connector attached thereto) may be attached to the sort bucket and/or external chamber via any convenient mechanism. In some cases, methods include attaching the collar via a plurality of screws.

In some instances, methods involve generating a positive-pressure system within the closed-system sorting flow cytometer. For example, where the sort block and adapter include one or more gas inlet port, methods include gaseously connecting the gas inlet port(s) to a compressor configured to fill the closed system with a first gas (e.g., nitrogen, carbon dioxide, hydrogen, argon). In certain cases, the compressor and gas inlet port(s) are gaseously connected via flexible tubing.

Computer-Controlled Systems

Aspects of the present disclosure further include computer-controlled systems, where the systems include one or more computers for complete automation or partial automation. In some embodiments, systems include a computer having a non-transitory computer readable storage medium with a computer program stored thereon, where the computer program when loaded on the computer includes instructions for irradiating a sample in a flow stream; acquiring, analyzing and recording flow cytometer data received following the irradiation of the sample; and sorting particles in the sample into two or more sample collection vessels based on the received flow cytometer data. In some embodiments, the computer program includes instructions for selectively activating deflection plates in order to divert droplets of interest into one or more collection vessels.

In embodiments, the system includes an input module, a processing module, and an output module. The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor, or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, Python, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, or a diskette drive. Such types of memory storage devices typically read from, and/or write to, a program storage medium (not shown) such as a compact disk. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, Wi-Fi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, a USB-C port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or Wi-Fi connection to the internet at a Wi-Fi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a workstation, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows® NT®, Windows® XP, Windows® 7, Windows® 8, Windows® 10, iOS®, macOS®, Linux®, Ubuntu®, Fedora®, OS/400®, i5/OS®, IBM i®, Android™, SGI IRIX®, Oracle Solaris® and others.

Figure 8:
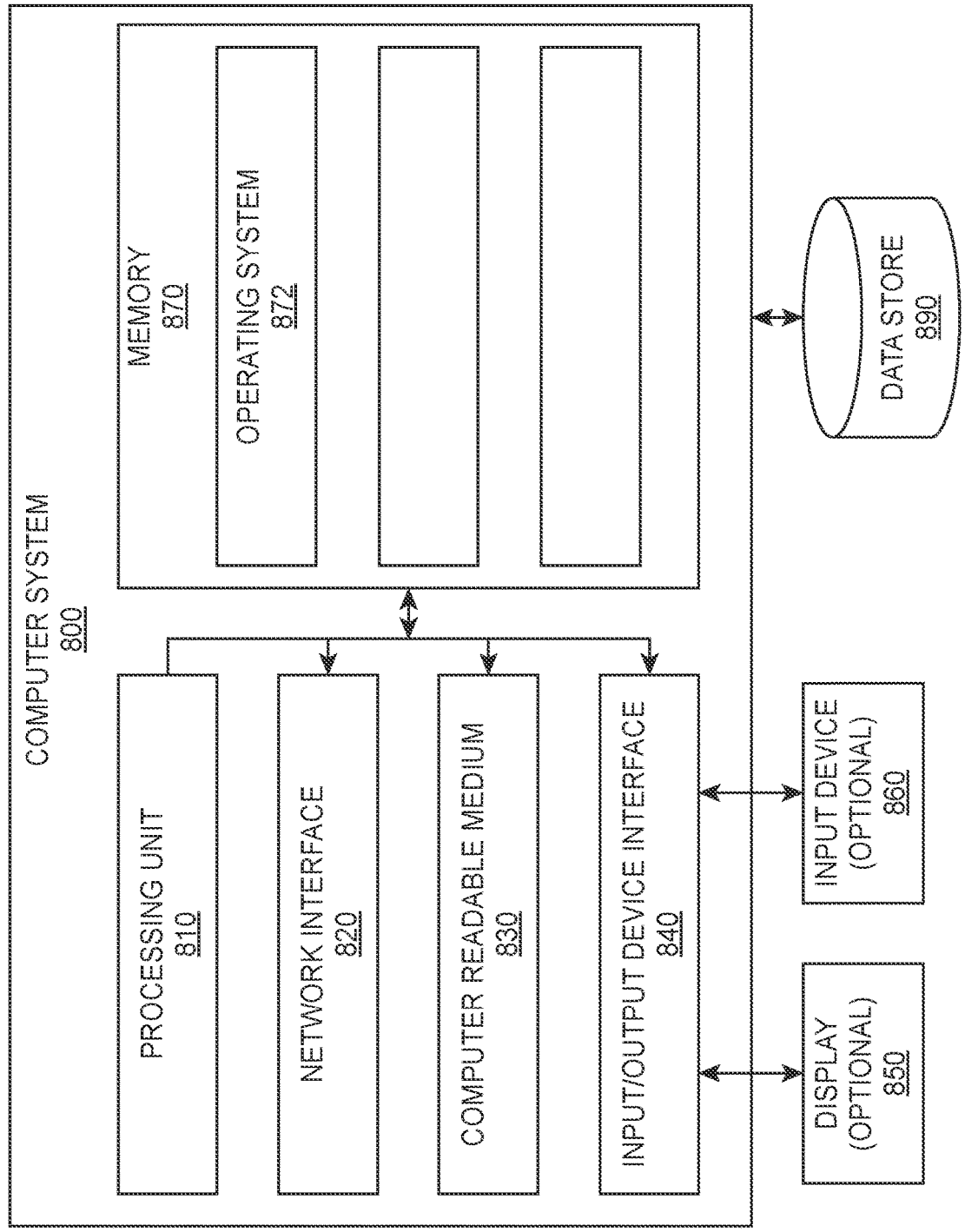
FIG. 8 depicts a block diagram of a computing system according to certain embodiments.

FIG. 8 depicts a general architecture of an example computing device 800 according to certain embodiments. The general architecture of the computing device 800 depicted in FIG. 8 includes an arrangement of computer hardware and software components. It is not necessary, however, that all of these generally conventional elements be shown in order to provide an enabling disclosure. As illustrated, the computing device 800 includes a processing unit 810, a network interface 820, a computer readable medium drive 830, an input/output device interface 840, a display 850, and an input device 860, all of which may communicate with one another by way of a communication bus. The network interface 820 may provide connectivity to one or more networks or computing systems. The processing unit 810 may thus receive information and instructions from other computing systems or services via a network. The processing unit 810 may also communicate to and from memory 870 and further provide output information for an optional display 850 via the input/output device interface 840. For example, an analysis software (e.g., data analysis software or program such as FlowJo®) stored as executable instructions in the non-transitory memory of the analysis system can display the flow cytometry event data to a user. The input/output device interface 840 may also accept input from the optional input device 860, such as a keyboard, mouse, digital pen, microphone, touch screen, gesture recognition system, voice recognition system, gamepad, accelerometer, gyroscope, or other input device.

The memory 870 may contain computer program instructions (grouped as modules or components in some embodiments) that the processing unit 810 executes in order to implement one or more embodiments. The memory 870 generally includes RAM, ROM and/or other persistent, auxiliary or non-transitory computer-readable media. The memory 870 may store an operating system 872 that provides computer program instructions for use by the processing unit 810 in the general administration and operation of the computing device 800. Data may be stored in data storage device 890. The memory 870 may further include computer program instructions and other information for implementing aspects of the present disclosure.

Utility

The subject adapters, flow cytometers and methods find use in a variety of applications where it is desirable to analyze and sort particle components in a sample in a fluid medium, such as a biological sample, and then store sorted products, e.g., for later use, such as therapeutic use. For example, embodiments of the invention described herein may be used to generate a closed system having a regulatable internal environment in order to, for example, generate a suitable environment for sorting microorganisms that undergo anaerobic respiration. In addition, the subject adapters, flow cytometers and methods may be employed to facilitate the conversion of a sorting flow cytometer to a closed-system sorting flow cytometer by reducing the need to individually modify flow cytometer components or place the entire flow cytometer within a positive-pressure system. Embodiments of the invention also find use where it is desirable to provide a flow cytometer with improved cell sorting accuracy, enhanced particle collection, particle charging efficiency, more accurate particle charging and enhanced particle deflection during cell sorting. Embodiments of the invention further provide for closed sorting devices and methods, which may reduce, if not eliminate, one or more of: risk of contamination of the sample be processed; risk of exposure of operators to sample components, which may be important in situations where biohazardous samples are being processed; etc.

Embodiments of the invention find use in applications where cells prepared from a biological sample may be desired for research, laboratory testing or for use in therapy. In some embodiments, the subject methods and devices may facilitate obtaining individual cells prepared from a target fluidic or tissue biological sample. For example, the subject methods and systems facilitate obtaining cells from fluidic or tissue samples to be used as a research or diagnostic specimen for diseases such as cancer. Likewise, the subject methods and systems may facilitate obtaining cells from fluidic or tissue samples to be used in therapy. Methods and devices of the present disclosure allow for separating and collecting cells from a biological sample (e.g., organ, tissue, tissue fragment, fluid) with enhanced efficiency and low cost as compared to traditional flow cytometry systems.

Kits

Aspects of the present disclosure further include kits, where kits include one or more components of the subject closed-system flow cytometer adapters. In some instances, kits include one or more sort block couplers for operably connecting to a sort block of a sorting flow cytometer, one or more external chambers, and one or more connectors for gaseously coupling the sort block to the external chamber. Kits may additionally include sort buckets configured to house a plurality of collection vessels for collecting sorted droplets. Kits of the present disclosure may further include sealing gaskets and latches for attaching the sort block coupler and/or sort block while maintaining the integrity of the closed system. In certain cases, the connectors included in the instant kits include collars for attaching the connector to the external chamber and/or the sort bucket. Kits may further include screws and sealing compounds for attaching the connector to the external chamber and the sort bucket.

Kits may also include instructions for assembling a flow cytometer having a closed-system sorting flow cytometer adapter. The instructions described herein may be included on storage media such as a floppy disk, hard disk, optical disk, magneto-optical disk, CD-ROM, CD-R magnetic tape, non-volatile memory card, ROM, DVD-ROM, Blue-ray disk, solid state disk, and network attached storage (NAS). Any of these program storage media, or others now in use or that may later be developed, may be included in the subject kits. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Although the foregoing invention has been described in some detail by way of illustration and example for purposes of clarity of understanding, it is readily apparent to those of ordinary skill in the art in light of the teachings of this invention that some changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A sorting flow cytometer, the sorting flow cytometer comprising:
   an illumination source for illuminating a flow cell at an interrogation point;
   a detector for receiving light from the interrogation point;
   a sort block in liquid-receiving relationship with the flow cell; and
   a closed-system sorting flow cytometer adapter in droplet-receiving relationship with the sort block, the adapter comprising:
   a sort block coupler operably connected to the sort block;
   an external chamber; and
   a connector gaseously coupling the sort block to the external chamber, optionally via a sort bucket that is in cellular-receiving relationship with the sort block coupler,
   wherein the adaptor is configured to generate a closed positive pressure system within the sorting flow cytometer.

2. The sorting flow cytometer according to claim 1, further comprising the sort bucket.

3. The sorting flow cytometer according to claim 2, wherein the sort bucket is configured to house a plurality of collection vessels for collecting droplets received from the sort block.

4. The sorting flow cytometer according to claim 1, wherein the sort block coupler comprises a sealing gasket.

5. The sorting flow cytometer according to claim 1, wherein the adapter comprises a collar for attaching the connector to the external chamber.

6. The sorting flow cytometer according to claim 1, further comprising a gas inlet port for filling the closed system with a first gas.

7. The sorting flow cytometer according to claim 6, wherein the sorting flow cytometer comprises a plurality of gas inlet ports.

8. The sorting flow cytometer according to claim 6, further comprising a compressor gaseously connected to the gas inlet port, wherein the compressor is configured to fill the closed system with the first gas.

9. The sorting flow cytometer according to claim 8, further comprising a gas relief valve for allowing a second gas to escape from the closed system.

10. The sorting flow cytometer according to claim 9, further comprising a gas sensor configured to assess the concentration of the second gas within the closed system.

11. The sorting flow cytometer according to claim 10, wherein the gas sensor is configured to assess the concentration of oxygen.

12. The sorting flow cytometer according to claim 10 or 11, wherein the compressor is operably connected to the gas sensor and is configured to regulate the concentration of the second gas based on the assessment from the gas sensor.

13. The sorting flow cytometer according to claim 8, wherein the compressor is configured to fill the closed system with the first gas at a pressure ranging from 5 psi to 40 psi.

14. The sorting flow cytometer according to claim 1, wherein the adapter further comprises an internal door configured to permit the flow of gas between the sort block and external chamber when the internal door is open and prevent the flow of gas between the sort block and external chamber when the internal door is closed.

15. The sorting flow cytometer according to claim 1, wherein the sort block comprises a deflection plate.

16. A method of converting a sorting flow cytometer having a sort block into a closed-system flow cytometer, the method comprising operably connecting a closed-system sorting flow cytometer adapter to the sorting flow cytometer, wherein the adapter comprises:
a sort block coupler operably connected to the sort block;
an external chamber; and
a connector gaseously coupling the sort block to the external chamber, optionally via a sort bucket that is in cellular-receiving relationship with the sort block coupler,
wherein the adaptor is configured to generate a closed positive pressure system within the sorting flow cytometer.

17. The method according to claim 16, further comprising operably connecting the sort bucket to the sort block coupler.

18. A method of sorting particles from a sample, the method comprising:
(a) introducing the particles into a sorting flow cytometer comprising:
an illumination source for illuminating a flow cell at an interrogation point;
a detector for receiving light from the interrogation point;
a sort block in liquid-receiving relationship with the flow cell; and
a closed-system sorting flow cytometer adapter in droplet-receiving relationship with the sort block, the adapter comprising:
a sort block coupler operably connected to the sort block;
an external chamber; and
a connector gaseously coupling the sort block to the external chamber, optionally via a sort bucket that is in cellular-receiving relationship with the sort block coupler,
wherein the adaptor is configured to generate a closed positive pressure system within the sorting flow cytometer; and
(b) flow cytometrically sorting the particles.

19. The method according to claim 18, wherein the sorting flow cytometer further comprises the sort bucket.

* * * * *